(12) United States Patent
Suzuki et al.

(10) Patent No.: US 7,919,911 B2
(45) Date of Patent: Apr. 5, 2011

(54) IMAGE DISPLAY APPARATUS

(75) Inventors: Mutsumi Suzuki, Kodaira (JP);
Masakazu Sagawa, Inagi (JP); Toshiaki Kusunoki, Tokorozawa (JP)

(73) Assignee: Hitachi, Ltd., Tokyo (JP)

( * ) Notice: Subject to any disclaimer, the term of this patent is extended or adjusted under 35 U.S.C. 154(b) by 351 days.

(21) Appl. No.: 12/153,509

(22) Filed: May 20, 2008

(65) Prior Publication Data
US 2009/0039761 A1 Feb. 12, 2009

(30) Foreign Application Priority Data

Aug. 6, 2007 (JP) ................................ 2007-204324

(51) Int. Cl.
H01J 1/00 (2006.01)
(52) U.S. Cl. ...................... 313/311; 313/495; 315/169.3
(58) Field of Classification Search .................. 313/414, 313/441–460, 495–497, 293–304, 306, 309–310, 313/346, 351, 355
See application file for complete search history.

(56) References Cited

U.S. PATENT DOCUMENTS

| 6,538,391 | B1 * | 3/2003 | Suzuki et al. | 315/169.3 |
| 2003/0057825 | A1 * | 3/2003 | Kusunoki et al. | 313/495 |
| 2007/0035229 | A1 | 2/2007 | Mikami et al. | |
| 2007/0200486 | A1 * | 8/2007 | Okanan et al. | 313/496 |

FOREIGN PATENT DOCUMENTS

| JP | 10-079221 | 9/1996 |
| JP | 10-112254 | 10/1996 |
| JP | 11-204024 | 1/1998 |
| JP | 2004-363075 | 10/2003 |
| JP | 2005-230504 | 2/2004 |
| JP | 2007-048548 | 8/2005 |

OTHER PUBLICATIONS

Nobuyasu Negishi et al., "High Efficiency Electron-Emission in Pt/SiO$_x$/Si/Al Structure", Jpn. J. Appl. Phys., vol. 36 (1997), pp. L939-L941.

Nobuyoshi Koshida et al., "Cold Electron Emission from Electroluminescent Porous Silicon Diodes", Jpn. J. Appl. Phys., vol. 34 (1995), pp. L705-L707.

Toshiaki Kusunoki et al., "Emission Current Enhancement of MIM Cathodes by Optimizing the Tunneling Insulator Thickness", IEEE Transactions on Electron Devices, vol. 49, No. 6, Jun. 2002, pp. 1059-1065.

* cited by examiner

Primary Examiner — Peter J Macchiarolo
Assistant Examiner — Donald L Raleigh
(74) Attorney, Agent, or Firm — Stites & Harbison PLLC; Juan Carlos A. Marquez, Esq.

(57) ABSTRACT

By making Nd concentration in the tunneling insulating film 11 smaller than Nd concentration in the base electrode first layer 16, the accumulated electric charge amount in the tunneling insulating film 11 is reduced and afterimage is decreased. By setting a relation between a position of a stack interface of the base electrode 13 and a thickness of an insulating layer properly, the generation of a device defect is prevented.

18 Claims, 20 Drawing Sheets

CROSS-SECTION ALONG C-D

CROSS-SECTION ALONG A-B

CROSS-SECTION ALONG C-D

CROSS-SECTION ALONG A-B

CROSS-SECTION ALONG C-D

CROSS-SECTION ALONG A-B

CROSS-SECTION ALONG C-D

CROSS-SECTION ALONG A-B

CROSS-SECTION ALONG C-D

CROSS-SECTION ALONG A-B

CROSS-SECTION ALONG C-D

CROSS-SECTION ALONG A-B

CROSS-SECTION ALONG C-D

CROSS-SECTION ALONG A-B

CROSS-SECTION ALONG C-D

CROSS-SECTION ALONG A-B

CROSS-SECTION ALONG C-D

CROSS-SECTION ALONG A - B

CROSS-SECTION ALONG C - D

CROSS-SECTION ALONG A-B

CROSS-SECTION ALONG C-D

CROSS-SECTION ALONG A-B

CROSS-SECTION ALONG C-D

IMAGE DISPLAY APPARATUS

INCORPORATION BY REFERENCE

The present application claims priority from Japanese application JP 2007-204324 filed on Aug. 6, 2007, the content of which is hereby incorporated by reference into this application.

BACKGROUND OF THE INVENTION

The present invention relates to an image display apparatus, which displays an image by using an electron emission element placed in matrix form, and a phosphor.

A matrix electron-emitter display is a display, wherein intersections of a group of electrodes mutually perpendicular are defined as pixels; an electron emission element is set on each of the pixels; the amount of emitted electrons are controlled by adjusting an applied voltage or a pulse width to every electron emission element; the emitted electrons are bombarded onto a phosphor after being accelerated in vacuum; light is emitted from a bombarded part of the phosphor. The electron emission element includes an element that uses a field-emission type cathode, an element that uses a MIM (Metal-Insulation-Metal) cathode, an element that uses a carbon-nanotube cathode, an element that uses a diamond cathode, an element that uses a surface-conduction electron-emitter element, an element that uses a ballistic electron surface-emitting cathode, and the like. Thus, a matrix electron-emitter display means a cathodoluminescent flat-panel display combining an electron emission element and a phosphor.

As shown in FIG. 8, a matrix electron-emitter display has a structure in which a cathode plate 601 placed with an electron emission element and a phosphor plate 602 forming a phosphor, are placed opposite. In order to make electrons emitted from an electron-emitter element 301 reach the phosphor and to excite the phosphor for emitting light, the space surrounded by the cathode plate, the phosphor plate and a frame component 603 is kept vacuum. In order to withstand the atmospheric pressure, a spacer (a support) 60 is inserted between the cathode plate and the phosphor plate.

The phosphor plate 602 has an acceleration electrode 122 and high voltage ranging from approximately 3 KV to 10 KV is applied to the acceleration electrode 122. Electrons emitted from the electron-emitter element 301 are bombarded onto the phosphor to excite the phosphor to emit light, after being accelerated by the high voltage.

A matrix electron-emitter display has a structure in which a cathode plate placed with an electron emission element and a phosphor plate forming a phosphor, are placed opposite. In order to make electrons emitted from the electron-emitter element reach the phosphor and to excite the phosphor for emitting light, the space surrounded by the cathode plate, the phosphor plate and a frame component is kept vacuum. In order to withstand the atmospheric pressure, a spacer (a support) is inserted between the cathode plate and the phosphor plate.

The phosphor plate has an acceleration electrode and high voltage ranging from approximately 3 KV to 10 KV is applied to the acceleration electrode. Electrons emitted from the electron-emitter element are bombarded onto the phosphor to excite the phosphor for emitting light, after being accelerated by high voltage.

An electron emission element to be used for a matrix electron-emitter display includes a thin-film electron emitter. The thin-film electron emitter has a structure in which a top electrode, an electron acceleration layer, and a base electrode are stacked and includes a MIM (Metal-Insulation-Metal) cathode, a MOS (Metal-oxide Semiconductor) cathode, a ballistic electron surface-emitting cathode and the like. The MOS cathode which uses a stacked film comprising of a semiconductor and an insulator as an electron acceleration layer and is described, for example, in Japanese Journal of Applied Physics, Vol. 36, Part 2, No. 7B, pp. L939-L941 (1997). The ballistic electron surface-emitting cathode uses porous silicon as an electron acceleration layer and is described, for example, in Japanese Journal of Applied Physics, Vol. 34, Part 2, No. 6A, pp. L705-L707 (1995). The thin-film electron emitter emits electrons accelerated in the electron acceleration layer into vacuum.

FIG. 2 shows an energy-band diagram showing an operation principle of a thin-film electron emitter. base electrode 13, an electron acceleration layer 12, and a top electrode 11 are stacked and a condition in which positive voltage is applied to the top electrode 11 is illustrated. In the case of a MIM cathode, an insulator is used as the electron acceleration layer 12. An electric field is generated in the electron acceleration layer 12 by voltage applied between the top electrode and the base electrode. By this electric field, electrons flow into the electron acceleration layer 12 from the base electrode 13 due to a tunneling phenomenon. These electrons are accelerated by the electric field in the electron acceleration layer 12 and become hot electrons. While these hot electrons pass through the top electrode 11, a part of electrons lose energy because of inelastic scattering and the like. When the hot electrons reach an interface between the top electrode 11 and vacuum, electrons, which have larger kinetic energy than surface work function Φ, are emitted into vacuum 10. In the present specification, an electric current which flows between the base electrode 13 and the top electrode 11 is referred to as a diode current Jd, and an electric current which is emitted into vacuum, is referred to as an emission current Je.

Compared with a field-emission type cathode, a thin-film electron emitter has a characteristic suitable for a display apparatus such as having high resistance to surface contamination, being able to realize a high-resolution display apparatus because of small divergence of an emission electron beam, having a voltage circuit driver with low voltage due to a low operation voltage, and the like.

On the other hand, in the thin-film electron emitter, only some part of a driving current is emitted to vacuum (an emission current Je). Here, the driving current is a current flowing between the top electrode and the base electrode, and it is sometimes referred to as a diode current Jd as well. The ratio α (electron emission ratio α=Je/Jd) of the emission current Je to the diode current Jd is ranging just from 0.1% to several tens %. That is, in order to get the emission current Je, it is necessary to supply the driving current (diode current) being just Jd=Je/α to the thin-film electron emitter from the driving circuit.

SUMMARY OF THE INVENTION

A matrix electron-emitter display using a thin-film electron emitter as an electron emission element, had a problem that, just after changing greatly display brightness, correct brightness (gray scale) is not displayed and an afterimage remains.

In addition, in the case that an anodized film of the base electrode is used as an insulator of the thin-film electron emitter, there is a case that a preferable composition as the insulator and a preferable composition as the electrode material are different. In this case, though a stacked film will be used as the base electrode, in the case that the stacked film is anodized, there was a problem that insulation failure is likely to occur in the anodized film.

The present invention provides an image display apparatus, which reduces this afterimage. In addition, in the case that an anodized film is formed on a surface of the stacked film electrode, the present invention provides a structure which does not generate insulation failure, and an image display apparatus which makes it possible to apply a preferable material composition to an insulating layer of a thin-film electron emitter.

Brief description on an outline of a typical apparatus according to the present invention is as follows.

An image display apparatus, which has a substrate having a plurality of electron emission elements, and a faceplate having a phosphor, wherein an electron emission element has a base electrode, a top electrode and a first insulator interleaved between the base electrode and the top electrode, is a thin-film electron emitter which emits electrons from the top electrode side by applying voltage between the base electrode and the top electrode, characterized in that the first insulator defining an electron emission area, the second insulator thicker than the first insulator and composed of an oxidized film formed by oxidizing the base electrode, and a transition region where film thickness changes continuously between the first insulator and the second insulator, are formed on the base electrode;

the base electrode is a stacked structure of a base electrode first layer and a base electrode second layer;

and a stack interface between the base electrode first layer and the base electrode second layer, is not included in the second insulator.

An image display apparatus, which has a substrate having a plurality of electron emission elements and a faceplate having a phosphor, wherein the electron emission element has a base electrode, a top electrode and a first insulator interleaved between the base electrode and the top electrode, and is a thin-film electron emitter which emits electrons from the top electrode side by applying voltage between the base electrode and the top electrode, characterized in that:

the base electrode is a stacked structure of a base electrode first layer and a base electrode second layer;

the first insulator defining an electron emission area, a second insulator thicker than the first insulator, and a transition region where film thickness changes continuously between the first insulator and the second insulator, are formed on the base electrode;

the first insulator and the second insulator are anodized films formed by anodizing the base electrode second layer;

and a stack interface between the base electrode first layer and the base electrode second layer, is not included in the second insulator.

An image display apparatus which has a substrate having a plurality of electron emission elements and a faceplate having a phosphor, wherein the electron emission element has a base electrode, a top electrode and a first insulator interleaved between the base electrode and the top electrode, and is a thin-film electron emitter which emits electrons from the top electrode side by applying voltage between the base electrode and the top electrode, characterized in that:

the first insulator is an anodized film formed by anodizing the base electrode;

the base electrode is a single layer and an alloy having aluminum and an additive element;

and the additive element is any one of magnesium, yttrium and scandium, or a plurality of combination.

As mentioned above, according to the present invention, an image display apparatus using a thin-film electron emitter can reduce an afterimage, which is generated after changing greatly a display gray scale level (brightness). Thus, an image display apparatus based on the present invention could realize an image display apparatus, which displays an image of higher quality than ever before.

The present invention made it possible to select a preferable material as an anodized film and a preferable material as an electrode by using a stacked film as a base electrode and by anodizing the stacked film.

DETAILED DESCRIPTION OF THE EMBODIMENTS

Figure 3A:
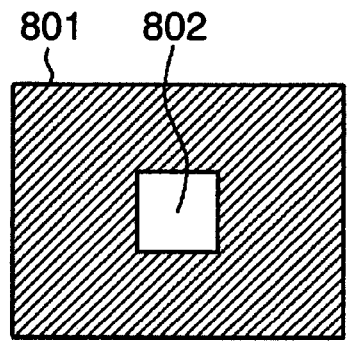
FIGS. 3A and 3B are exemplary views explaining an afterimage phenomenon.

An afterimage is a phenomenon in which an image before a gray scale change remains slightly after a gray scale (brightness) of display image is greatly changed. By way of example, as shown in FIG. 3A, the case where a rectangular (window-shaped) pattern 802 is displayed on a part of a display screen 801, is considered.

It should be noted that, though the present specification explains that the number of gray scales of an image signal is 256 gray scales, it is obvious that the present invention can be applied to an image display apparatus with the number of gray scales different from the above. In the explanation below, it is set that the darkest gray scale level is "gray scale 0" and the brightest gray scale level is "gray scale 255".

Figure 3B:
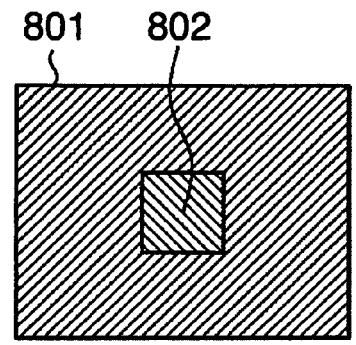

It is set that a pattern 802 is the peak gray scale (the highest gray scale. For example, "255 level".) and the other region is the average gray scale (for example, "gray scale 64"). Then, the case where the same gray scale (for example, "gray scale 64 level") is displayed on the whole screen is considered (FIG. 3B). For a period of time after the gray scale is changed, the region displaying the pattern 802 becomes a little darker than the other region. As time passes, the region 802 comes to have the same gray scale with that in the other region. This is the afterimage.

Figure 4:
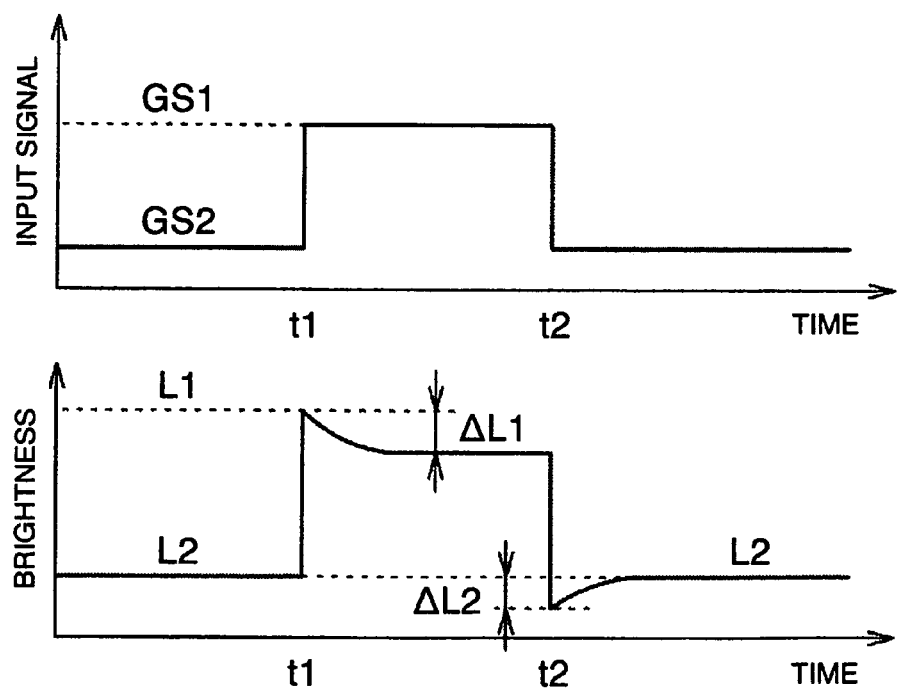
FIG. 4 is an exemplary diagram explaining an afterimage phenomenon. A diagram explaining in time series.

In order to describe the afterimage phenomenon in more detail, FIG. 4 is used for explanation. FIG. 4 is a diagram showing exemplarily an input signal (gray scale signal) and time change of brightness displayed actually in the region 802. The input signal is changed from gray scale level "GS2" to "GS1" at a time t1. The input signal is changed from gray scale level "GS1" to "GS2" at a time t2. Though the gray scale level is arbitrary, by way of example, "GS1" is decided to be "255 gray scale" corresponding to the peak brightness and "GS2" to be "64 gray scale". The display brightness corresponding to the gray scale level "GS1" is "L1", and the display brightness corresponding to the gray scale level "GS2" is "L2".

Though brightness goes up from "L2" to "L1" at a time t1, then it changes to the brightness level "L1−ΔL1" after a certain period of time. Though, at a time t2, brightness is expected to change to "L2", actually it becomes once the lower brightness "(L2−ΔL2)" than "L2", and then becomes the brightness level "L2" after a certain period of time. Due to the behavior at a time t2, the afterimage phenomenon as in FIG. 3B is generated on a display screen.

In FIG. 4, after the input signal is changed over at a time t2, a period of time required for brightness to become the expected value "L2" is referred to as "afterimage time".

In order to improve the quality of a display image, it is important to shorten the afterimage time. For example, if the afterimage time is smaller than or equal to 0.1 second, the afterimage is rarely perceived owing to the human visual feature. However, in the case that a afterimage time is 10 seconds, because the image is clearly perceived to the human eyes, the image quality is degraded.

Generally, a typical method for displaying gray scale of a image display apparatus includes (a) Pulse amplitude modulation method (hereinafter referred to as "PAM") and (b) Pulse width modulation method (hereinafter referred to as "PWM"). While "PAM" adjusts brightness by changing pulse amplitude to be applied, "PWM" adjusts brightness by changing a pulse width to be applied Though the afterimage phenomenon described above appears in either method for displaying gray scale of "PAM" and "PWM", in "PAM" (pulse amplitude modulation method), an afterimage appears more remarkably. Therefore, in the image display apparatus conducting the gray scale display with "PAM", the countermeasures to a residual image has to be particularly taken.

Conventionally, in a image display apparatus using a thin-film electron emitter, in the case that a gray scale display is carried out by "PAM" (pulse amplitude modulation method), an afterimage time is approximately several tens to several hundreds seconds, which was a factor of degrading the quality of a display image. The present inventor investigated intensively the cause of generation of an afterimage, explained in FIGS. 3 and 4, in the image display apparatus using a thin-film electron emitter, and found the following causes. First of all, it was found that an electron emission ratio (=Je/Jd) of a thin-film electron emitter is constant when an afterimage is being generated. That is, the afterimage phenomenon occurs because a diode current shifts temporarily from an expected current level.

Figure 5:
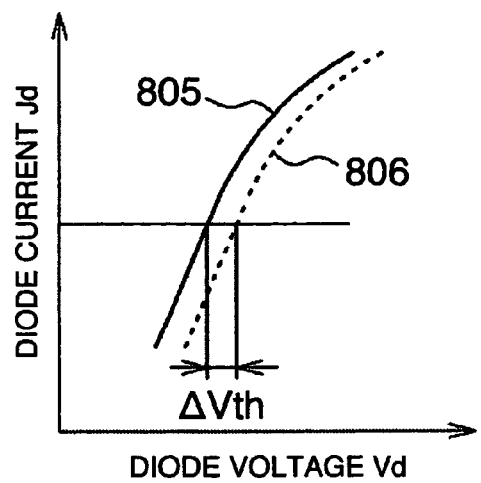
FIG. 5 is a diagram showing a voltage-current characteristic of a thin-film electron emitter element.

Then, the inventor found that the temporary diode current shift is caused by a change of voltage-current characteristic of a thin-film electron emitter. FIG. 5 is a diagram showing exemplarily the relation between a diode current (Jd) and a diode voltage (Vd) of a thin-film electron emitter. Here, the diode current Jd is a current which flows between a top electrode and a base electrode, and the diode voltage Vd is a voltage applied between the top electrode and the base electrode, and the top electrode voltage is measured using a base electrode potential as a standard. In FIG. 5, the diode current Jd was plotted on a logarithmic scale.

In FIG. 5, Jd-Vd characteristic 805 is a characteristic at a brightness level GS2, and Jd-Vd characteristic 806 is at brightness level GS1. While being driven with high brightness level GS1 (that is, in the region of large diode current), the Jd-Vd characteristic 806 shifts to a higher voltage side comparing to the characteristic 805. This is caused by that the larger a diode current is (at brightness level GS1), the bigger the amount of electrical charges which accumulate in an electron acceleration layer constructing a thin-film electron emitter, is. This will be explained by using FIGS. 6A and 6B.

Figure 6A:
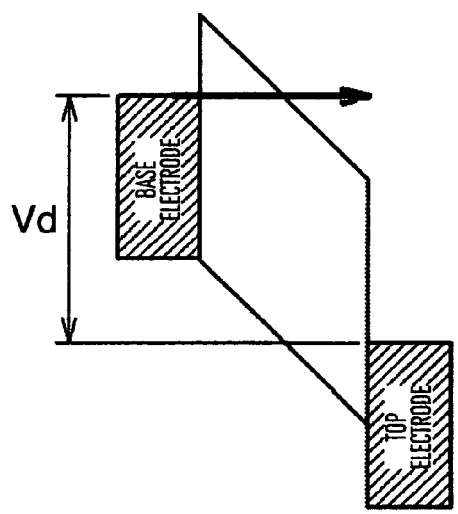
FIGS. 6A and 6B are views showing a mechanism of an afterimage phenomenon.
Figure 6B:
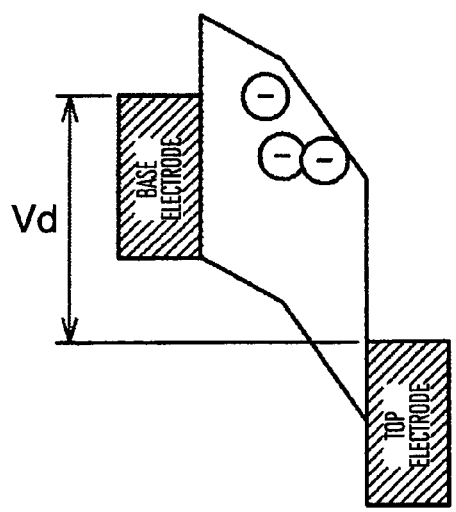

FIGS. 6A and 6B are diagrams showing exemplarily electron energy band diagrams of a thin-film electron emitter. In the case that there are no accumulated charges in an electron acceleration layer (FIG. 6A), an internal electric field equals to an electric field formed by externally applied voltage. Because this internal electric field is applied to the interface between the base electrode and the electron acceleration layer, electrons are emitted from the base electrode to the electron acceleration layer to become the diode current Jd. On the other hand, FIG. 6B shows the case that negative charges are accumulated in the electron acceleration layer. In this case, because the electric field, which the accumulated charges form, works to negate the external field, the internal field decreases. Therefore, even when the same external voltage Vd is applied, because the internal field is small, the diode current Jd becomes small. That is, the Jd-Vd characteristic has a pattern of shifting to a high voltage side.

By way of example, in a structure described in an embodiment below, though an operating voltage is approximately 8 V, a threshold voltage difference ΔVth between a Jd-Vd characteristic ("806" in FIG. 5) in the case of GS1="255 level" and a Jd-Vd characteristic ("805") in the case of GS2="64 level", was 15 mV.

An explanation will be given in associating a current-voltage characteristic in FIG. 5 with an afterimage characteristic in FIG. 4. In FIG. 4, just before the time t2, a Jd-Vd characteristic is the characteristic 806 in FIG. 5. Though an input signal becomes small in response to "GS2" at the time t2, because the amount of accumulated charges in the thin-film electron emitter does not change instantly, the Jd-Vd characteristic remains "806". Subsequently, the Jd-Vd characteristic shifts to the characteristic 805 responding to the input signal becoming small. When it becomes the original Jd-Vd characteristic 805, a brightness value becomes the original value L2.

As explained above, a process of a time change of the amount of accumulated charges in an electron acceleration layer of a thin-film electron emitter is a process of a recovery of an afterimage. Accordingly, if the amount of accumulated charges is decreased, an afterimage is decreased and a display quality is improved.

Hereinafter, an image display apparatus according to the present invention will be explained in more detail with reference to an embodiment of the invention using some practical embodiments shown in drawings.

Embodiment 1

Embodiment 1 using the present invention will be described. In this embodiment, a thin-film electron emitter is used as the electron emission element 301. More specifically, MIM (Metal-Insulator-Metal) electron emitter is used.

Figure 7:
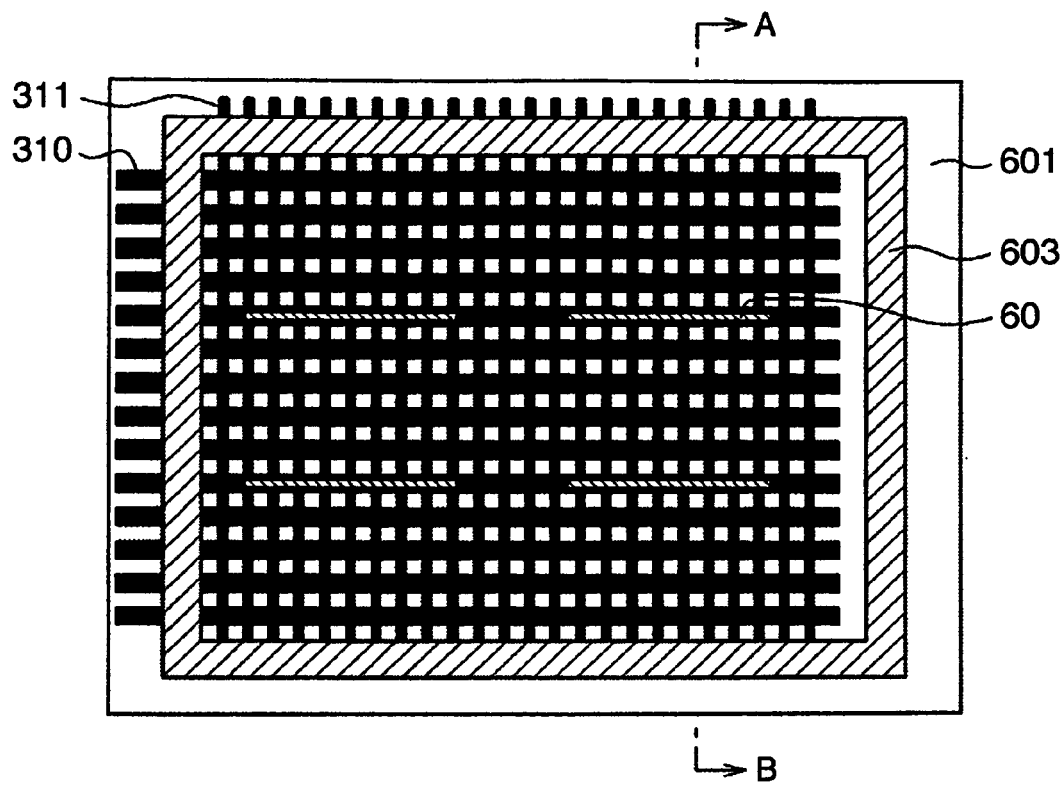
FIG. 7 is a plan view showing a structure of a display panel of an image display apparatus according to the present invention.
Figure 8:
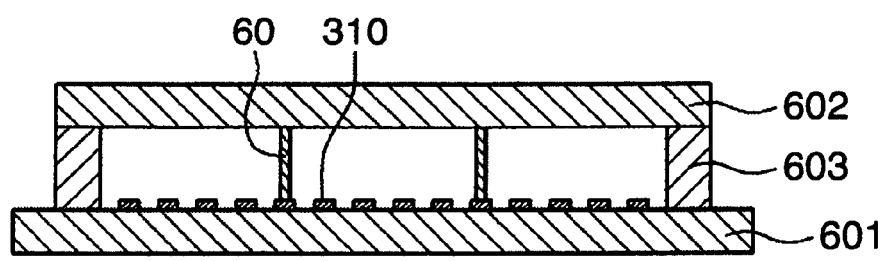
FIG. 8 is a cross-sectional view showing a structure of a display panel of an image display apparatus according to the present invention.

FIG. 7 is a plan view of a display panel used in the present embodiment. FIG. 8 is a cross-sectional view taken along the line A-B in FIG. 7. In FIG. 8, only a scan electrode 310 is taken and described among the structure components of a cathode plate 601.

The inside surrounded by the cathode plate 601, a phosphor plate 602 and a frame component 603 is kept vacuum. A spacer 60 is placed in the vacuum region to withstand the atmospheric pressure. The shape, the number and the placement of the spacer 60 are arbitrary. As shown in FIG. 7, the spacer 60 is placed on the scan line 310. The scan electrode 310 is placed in the horizontal direction on the cathode plate 601, and a data electrode 311 is placed perpendicularly to it. An intersection of the scan electrode 310 and the data electrode 311 corresponds to a pixel. Here, the pixel corresponds to a sub-pixel in the case of a color image display apparatus.

Though, in FIG. 7, only 14 lines of the scan electrode 310 are described, an actual display has several hundred to several thousand lines. As for the data electrode 311, an actual image display apparatus has several hundred to several thousand lines. The electron-emitter element 301 is placed in the vicinity of the intersection of the scan electrode 310 and the data electrode 311.

Figure 1:
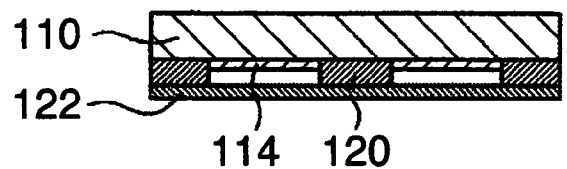
FIG. 1 is a cross-sectional view of a part of a display panel of an embodiment of an image display apparatus according to the present invention.
Figure 1:
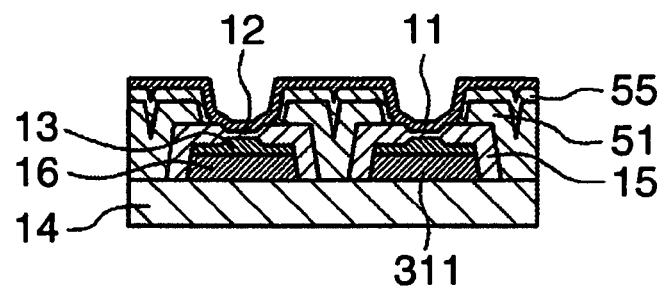
Figure 2:
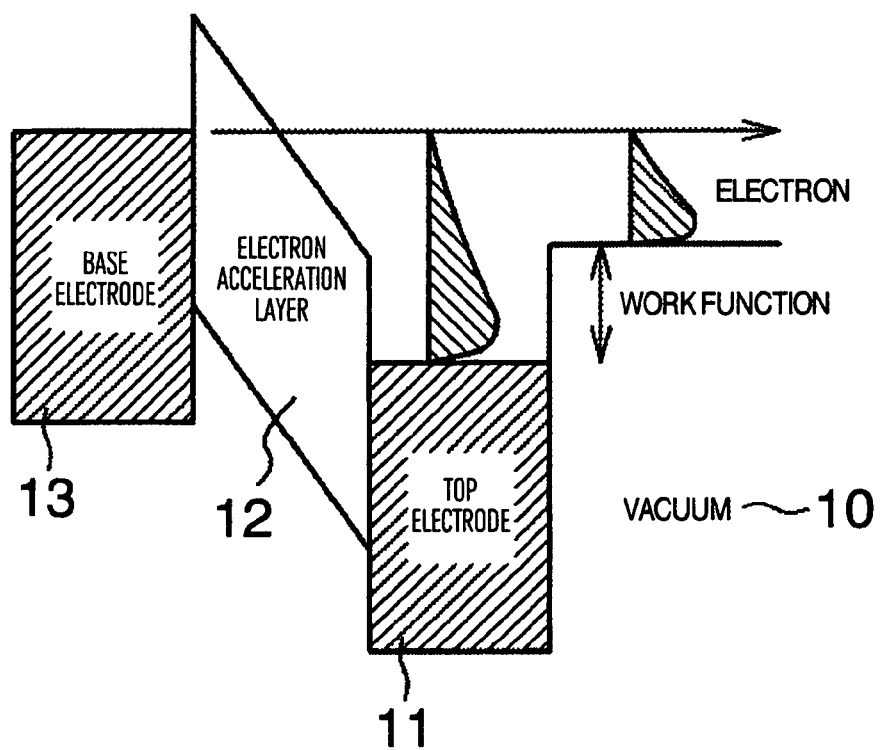
FIG. 2 is a view for explaining an electron emission mechanism of a thin-film electron emitter.
Figure 9:
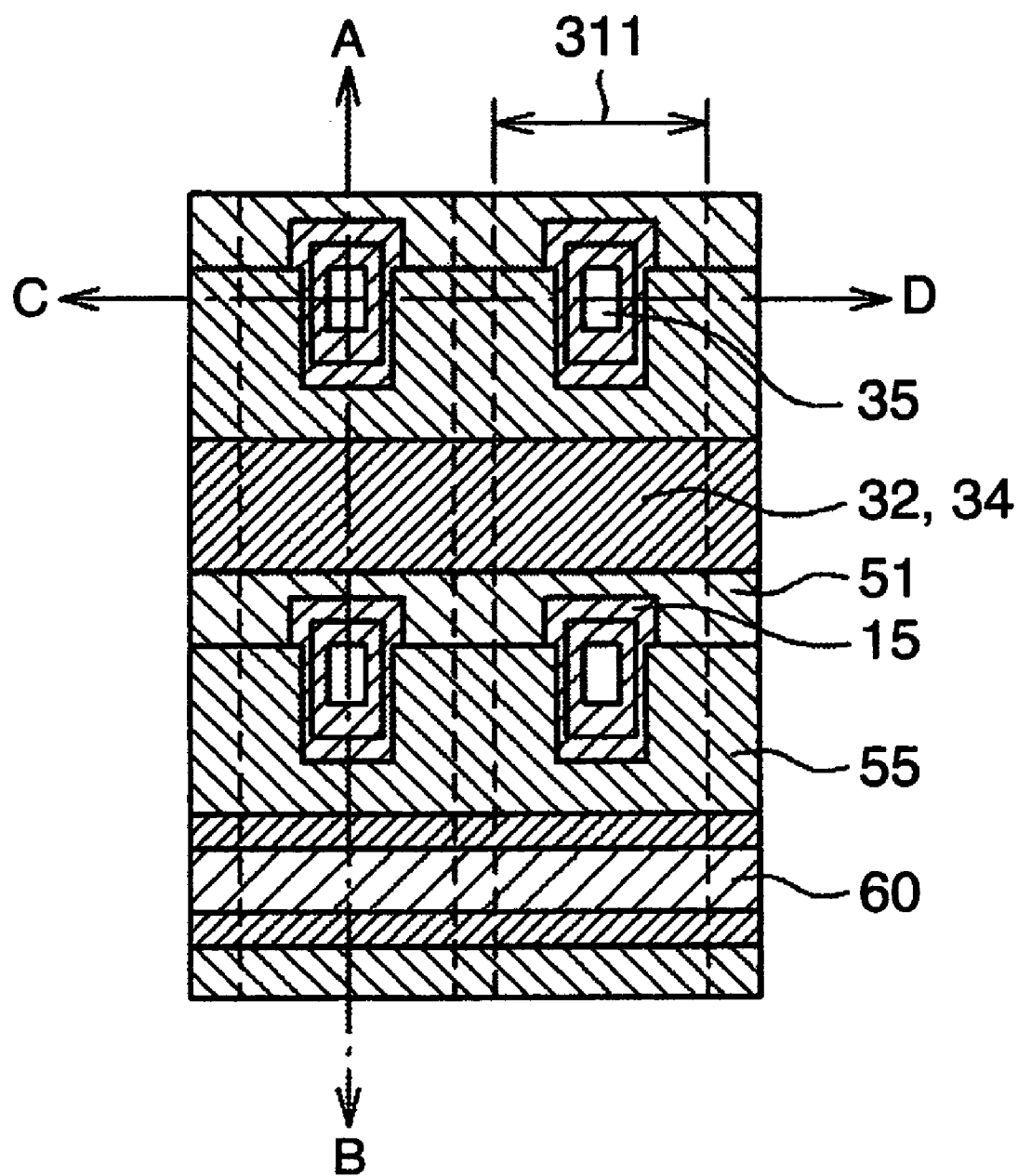
FIG. 9 is a plan view showing a part of a cathode plate of Embodiment 1 of an image display apparatus according to the present invention.
Figure 10A:
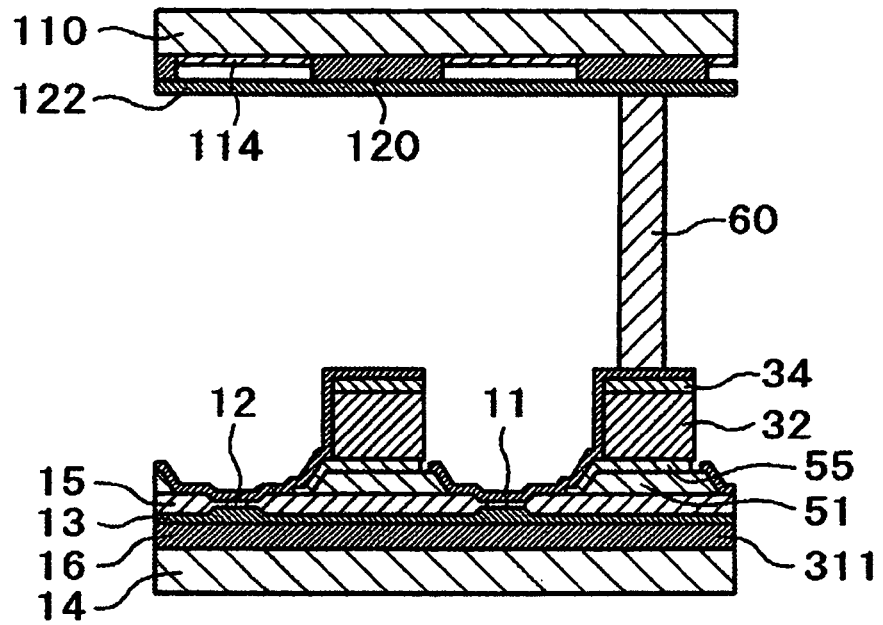
FIG. 10A is a cross-sectional view taken along the line A-B in FIG. 9, showing a part of a cathode plate of Embodiment 1 of an image display apparatus according to the present invention.
Figure 10B:
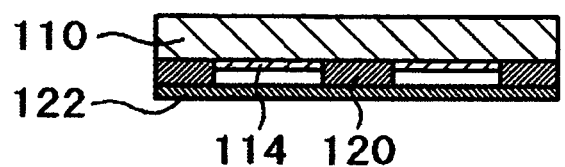
FIG. 10B is a cross-sectional view taken along the line C-D in FIG. 9, showing a part of a cathode plate of Embodiment 1 of an image display apparatus according to the present invention.

FIG. 9 is a plan view showing a part (4 sub-pixels part) of the cathode plate 601 in FIG. 7. FIGS. 10A and 10B are cross-sectional views of a part of the cathode plate 601 corresponding to FIG. 9. FIG. 10A is a cross-sectional view taken along the line A-B in FIG. 9 and FIG. 1 is a cross-sectional view taken along the line C-D in FIG. 9. It should be noted that the same view as FIG. 1 is described in FIG. 10B for your convenience to look at. Furthermore, FIG. 9 is a plan view in which a top electrode 11 is deleted. Actually, the top electrode 11 is entirely deposited on the surface as understood from cross-sectional views, FIGS. 10A and 10B.

A three-folded rectangular is placed on a position corresponding to each sub-pixel. The most inner side of the rectangular region shows an electron emission area 35 and corresponds to the most inner side periphery of the tapered-region (slope region) of a first inter-layer insulating film 15. The rectangular located at the outside corresponds to the most outer periphery of the tapered-region of the first inter-layer insulating film 15. The outside (the most outer periphery) is an opening of a second inter-layer insulating layer 51.

According to the present embodiment, the scan electrode 310 is comprised of a busline electrode 32. In addition, in the present embodiment, the spacer 60 is placed on the scan electrode 310. It is not necessary to place the spacer 60 on every scan electrode, but it is sufficient to place on every several pieces of the scan electrodes.

The spacer 60 is electrically connected with the scan electrode 310 and works to pass an electric current flowing from the acceleration electrode 122 of the phosphor plate 602 through the spacer 60 and to pass electrical charges charged on the spacer 60.

The structure of the cathode plate 601 is as follows. The thin-film electron emitter 301 (an electron emission element 301 in the present embodiment) which is comprised of a base electrode first layer 16, a base electrode second layer 13, the insulating layer 12 and the top electrode 11, is constructed on an insulating substrate 14 such as glass. The busline electrode 32 is electrically connected with the top electrode 11 through a contact electrode 55. The busline electrode 32 works as a current feeding line to the top electrode 11. That is, it works to transmit an electric current to a position of this sub-pixel from a driving circuit. In addition, in the present embodiment, the busline electrode 32 works as the scan electrode 310.

In the present embodiment, a thin-film electron emitter is used as the electron emission element 301. As shown in FIGS. 10A and 10B, four elements, the base electrode first layer 16, the base electrode second layer 13, a tunneling insulating layer 12 and the top electrode 11, are the fundamental structure of the thin-film electron emitter. The electron emission area 35 in FIG. 9 is an area corresponding to the tunneling insulating layer 12. Electrons are emitted to vacuum from the surface of the top electrode 11 in the electron emission area 35. Constructing the base electrode with the stacked film of the base electrode first layer 16 and the base electrode second layer 13, is a feature of the present embodiment.

In the present embodiment, some part (region in the vicinity of the tunneling insulating layer 12) of a data electrode 311 is the base electrode first layer 16 and the base electrode second layer 13. In the present specification, the vicinity of the tunneling insulating layer 12 in the data electrode 311 is referred to as the base electrode 13.

It should be noted that, in FIGS. 10A and 10B, a scale in the vertical direction is arbitrary. That is, though the base electrode 13, the top electrode and the like have thickness equal to or smaller than several μm, the distance between the substrate 14 and a faceplate 110 is approximately 1 to 3 mm long.

A fabrication method for the cathode plate 601 will be explained by using FIGS. 11A to 19B. FIGS. 11A to 19B show a process to produce a thin-film electron emitter on the substrate 14. On these drawings, the thin-film electron emitter corresponding to sub-pixels with 2×2 pieces, is described. On each drawing, "A" shows a plan view, a cross-sectional view taken along the line "A-B" is shown in "B", and a cross-sectional view taken along the line "C-D" is shown in "C".

On the insulating substrate 14 such as glass, an Al—Nd (2 atomic %) alloy is formed (the base electrode first layer 16) to have, for example, 400 nm film thickness, as the material for the base electrode (the data electrode 311). On it, an Al—Nd (0.6 atomic %) alloy is formed (the base electrode second layer 13) to have 200 nm film thickness. For this aluminum alloy film formation, for example, a sputtering method, a resistance-heating evaporation method or the like is used. Next, by the resist formation by photolithography and the following etching, this aluminum alloy film is processed into a stripe-form to form the base electrode first layer 16 and the base electrode second layer 13. As for the resist used here, a resist suitable for etching is sufficient and, in addition, as for etching, either wet etching or dry etching can be used. It should be noted that a unit of concentration "atomic %" is also described as "at %" (abbreviation of "atomic %") in the present specification.

Figure 11A:
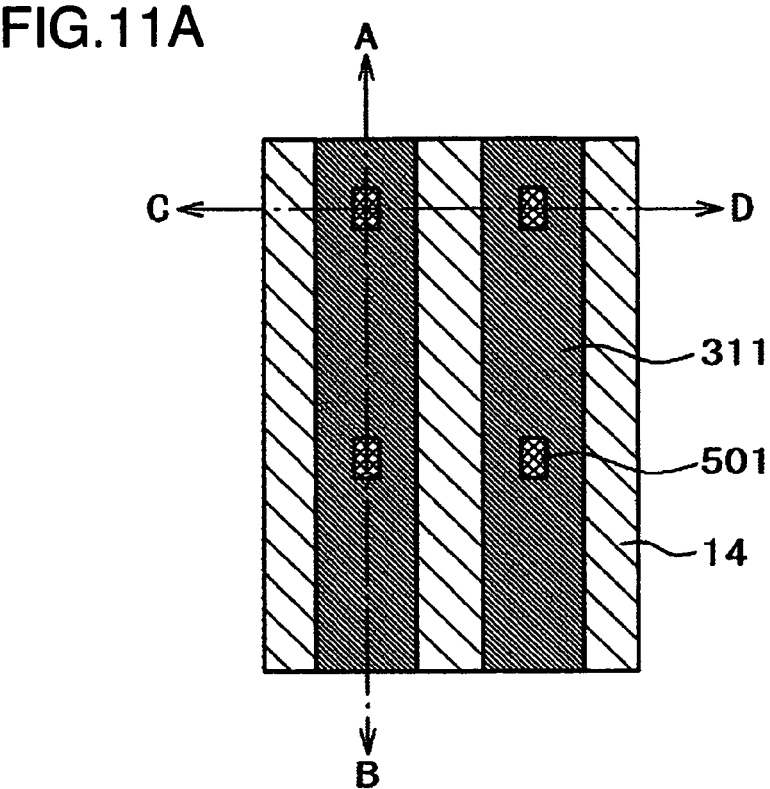
FIG. 11A is a plan view explaining a fabrication process of a cathode plate of Embodiment 1 of an image display apparatus according to the present invention.
Figure 11B:
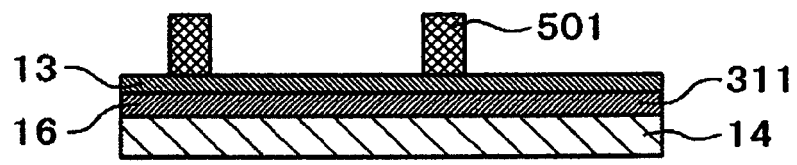
FIG. 11B is a cross-sectional view taken along the line A-B in FIG. 11A explaining a fabrication process of a cathode plate of Embodiment 1 of an image display apparatus according to the present invention.
Figure 11C:
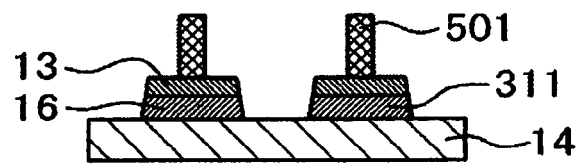
FIG. 11C is a cross-sectional view taken along the line C-D in FIG. 11A explaining a fabrication process of a cathode plate of Embodiment 1 of an image display apparatus according to the present invention.

Next, by resist coating, UV-ray exposing and patterning, a resist pattern 501 shown in FIGS. 11A to 11C is formed. For resist, for example, quinonediazide-type positive resist is used. Next, by anodizing while the resist pattern 501 is kept attached, the first inter-layer insulating layer 15 (the second insulating layer) is formed. For this anodization, in the present embodiment, an anodization voltage was set to 100 V and the film thickness of the first inter-layer insulating layer 15 was set to 140 nm. Then, the resist pattern 501 is removed. This is the situation in FIG. 12.

Figure 12A:
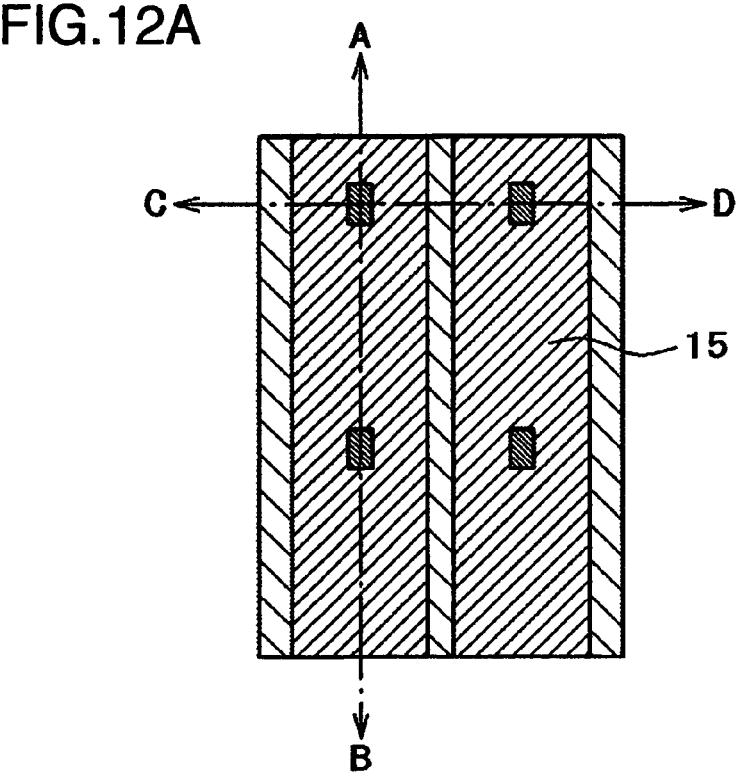
FIG. 12A is a plan view explaining a fabrication process of a cathode plate of Embodiment 1 of an image display apparatus according to the present invention.
Figure 12B:
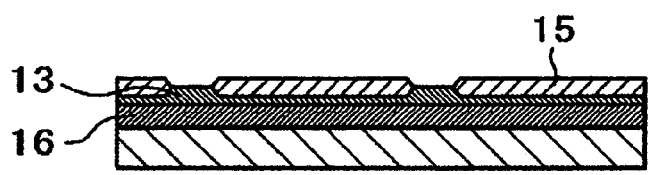
FIG. 12B is a cross-sectional view taken along the line A-B in FIG. 12A explaining a fabrication process of a cathode plate of Embodiment 1 of an image display apparatus according to the present invention.
Figure 12C:
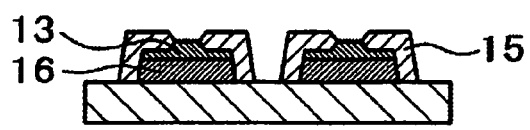
FIG. 12C is a cross-sectional view taken along the line C-D in FIG. 12A explaining a fabrication process of a cathode plate of Embodiment 1 of an image display apparatus according to the present invention.
Figure 13A:
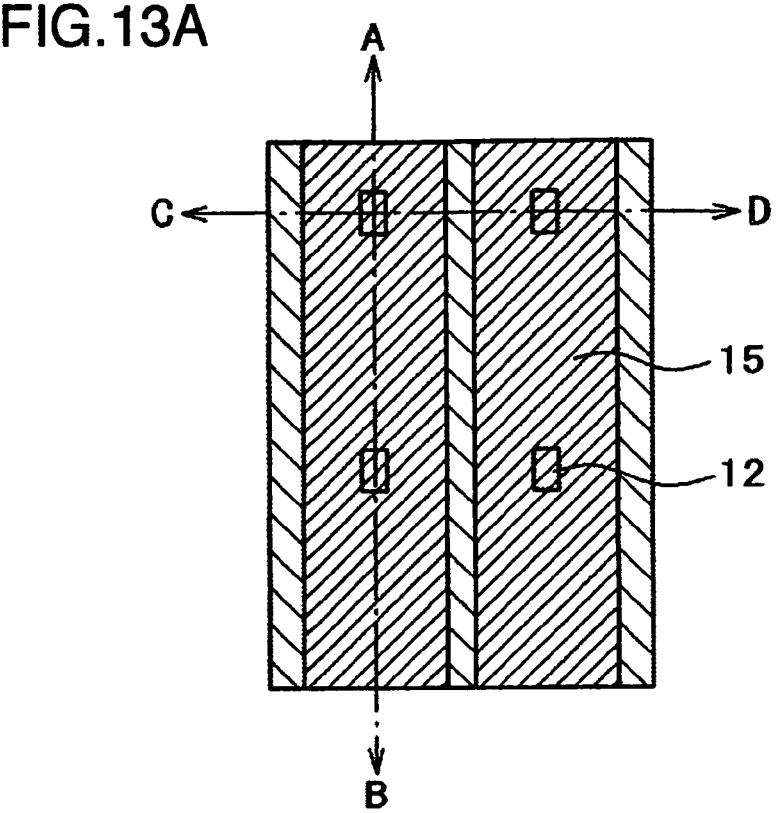
FIG. 13A is a plan view explaining a fabrication process of a cathode plate of Embodiment 1 of an image display apparatus according to the present invention.
Figure 13B:
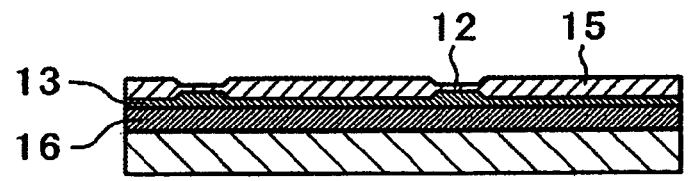
FIG. 13B is a cross-sectional view taken along the line A-B in FIG. 13A explaining a fabrication process of a cathode plate of Embodiment 1 of an image display apparatus according to the present invention.
Figure 13C:
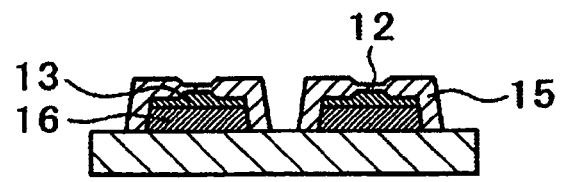
FIG. 13C is a cross-sectional view taken along the line C-D in FIG. 13A explaining a fabrication process of a cathode plate of Embodiment 1 of an image display apparatus according to the present invention.
Figure 14A:
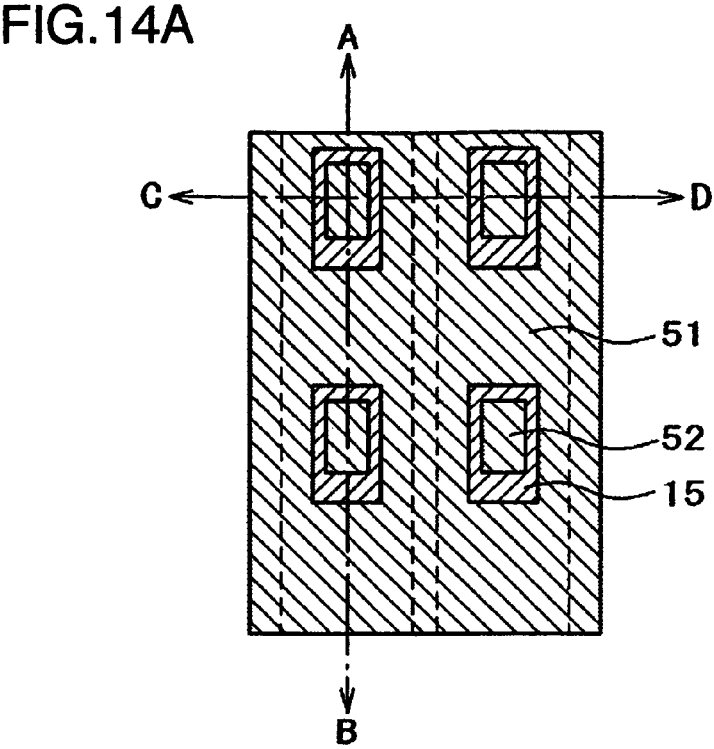
FIG. 14A is a plan view explaining a fabrication process of a cathode plate of Embodiment 1 of an image display apparatus according to the present invention.
Figure 14B:
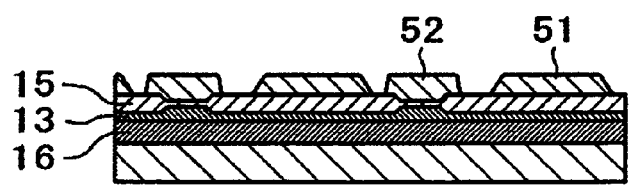
FIG. 14B is a cross-sectional view taken along the line A-B in FIG. 14A explaining a fabrication process of a cathode plate of Embodiment 1 of an image display apparatus according to the present invention.
Figure 14C:
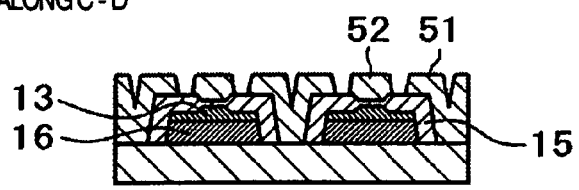
FIG. 14C is a cross-sectional view taken along the line C-D in FIG. 14A explaining a fabrication process of a cathode plate of Embodiment 1 of an image display apparatus according to the present invention.

Though, the first inter-layer insulating layer 15 in FIGS. 12A to 12C was explained to be anodized, it is possible to form by thermal oxidization. In this case, in FIGS. 11A to 11C, instead of the resist film 501, it is sufficient to form a highly thermal-resistant SiN film or the like and to oxidize thermally an Al alloy except a part coated by SiN or the like, constructing the base electrode, by heating the entire cathode substrate.

When aluminum is anodized, the volume increases than that of an original aluminum metal because oxygen atoms are inserted. When the original aluminum metal surface is set as standard, 4/10 of the thickness of the anodized film are formed outside the aluminum metal surface and the remaining 6/10 are formed inside. (inside the solid) the aluminum metal surface. Therefore, in the case of the present embodiment, since the thickness of the first inter-layer insulating film 15 is 140 nm, the first inter-layer insulating film 15 is formed up to 84 nm inside from the aluminum metal surface. Since the thickness of the base electrode second layer 13 is 200 nm, the first inter-layer insulating film 15 is formed inside the base electrode second layer 13. That is, the anodized film composing the first inter-layer insulating film 15 is configured not to cross the stack interface between the base electrode second layer 13 and the base electrode first layer 16. By this way, the occurrence of insulation failure is eliminated. This point will be described in more detail later.

Next, by anodizing the surface of the base electrode second layer 13 coated with the resist 501, the insulating layer 12 (the first insulating layer) is formed. In the present embodiment, the anodization voltage was set to 4 V and the thickness of insulating layer was set to 7.9 nm. This is the situation in FIGS. 13A to 13C. The region where the insulating layer 12 is formed becomes the electron emission area 35. That is, the region surrounded by the first inter-layer insulating layer 15 is the electron emission area 35.

It should be noted that it was reported conventionally that the film thickness "d" of the anodized insulation film obtained by anodizing aluminum, has a relation of "d" (nm)=1.36× VAO with the anodization voltage VAO [V]. According to the latest study done by the inventors, in the case that the thickness is smaller than about 20 nm, it is proved that the relation of "d" (nm)=1.36×(VAO+1.8) holds (IEEE Transactions on Electron Devices, vol. 49, No. 6, pp. 1059-1065, 2002). The value (the anodization voltage: 4 V and the thickness of the insulation film: 7.9 nm) described above is the value obtained from this latest relational expression.

Next, the second inter-layer insulating film 51 and an electron emission area protection layer 52 are formed (FIGS. 14A to 14C) by the following procedure. The pattern of the second inter-layer insulating film 51 is formed in the intersection region of the busline electrode 32 and the data electrode 311, and the electron-emission area 35 is formed as an exposed pattern. However, at a process step in FIGS. 14A to 14C, the electron emission area 35 is covered with the electron emission area protection layer 52. The second inter-layer insulating film 51 and the electron emission area protection layer 52 are patterned by etching after silicon nitride $SiN_x$, silicon oxide $SiO_x$ or the like is deposited. In the present embodiment, a silicon nitride film of 100 nm film thickness was used. Etching is carried out by dry etching using an etchant having, for example, $CF_4$ or $SF_6$ as a main component. The second inter-layer insulating film 51 is formed in order to improve insulation property between the scan electrode and the data electrode. The electron emission area protection layer 52 is a layer for protecting a part (that is, the insulating layer 12) to be the electron emission area 35 from process damage at the following steps, and is removed at the later step as described later. In the present embodiment, the second inter-layer insulating film 51 and the electron emission area protection layer 52 are formed by the same material and the same step.

Figure 15A:
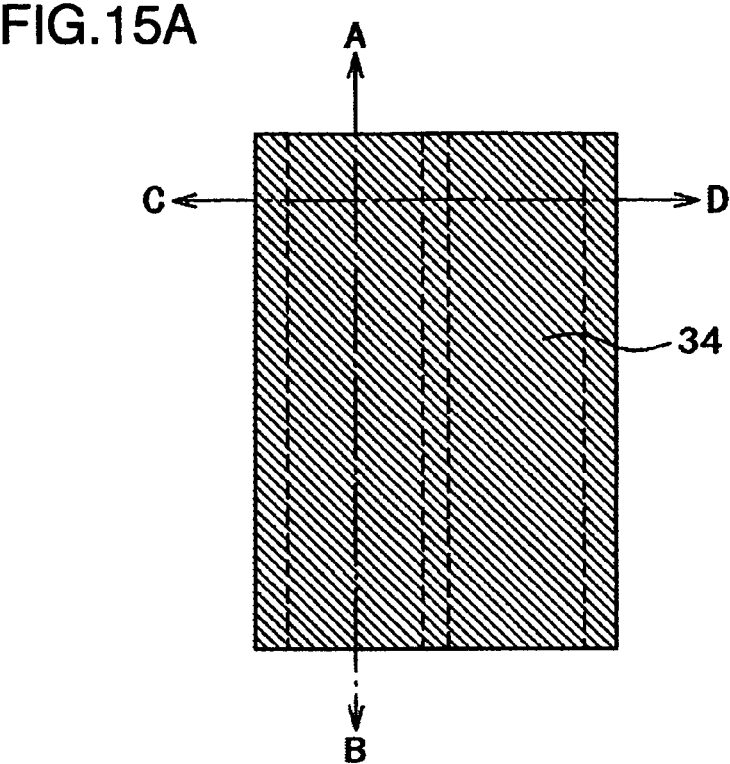
FIG. 15A is a plan view explaining a fabrication process of a cathode plate of Embodiment 1 of an image display apparatus according to the present invention.
Figure 15B:
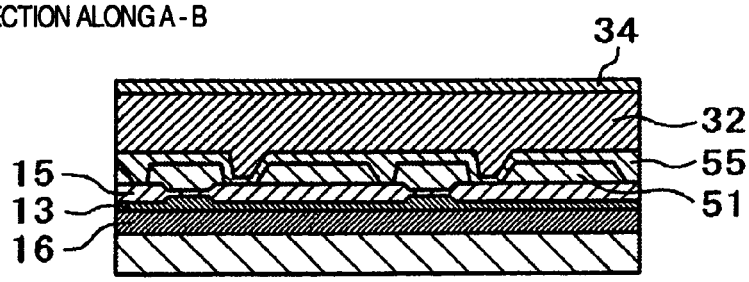
FIG. 15B is a cross-sectional view taken along the line A-B in FIG. 15A explaining a fabrication process of a cathode plate of Embodiment 1 of an image display apparatus according to the present invention.
Figure 15C:
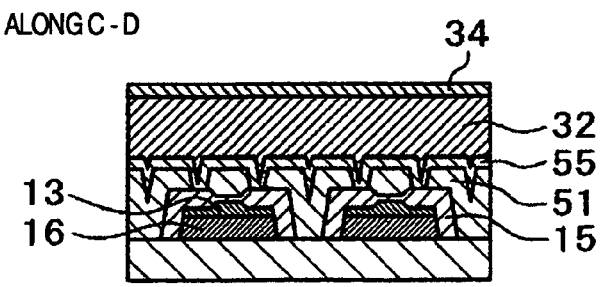
FIG. 15C is a cross-sectional view taken along the line C-D in FIG. 15A explaining a fabrication process of a cathode plate of Embodiment 1 of an image display apparatus according to the present invention.

Next, the materials which construct a contact electrode 55, the busline electrode 32, and a busline electrode upper layer 34, are deposited in the order above (FIG. 15). In the present embodiment, chromium (Cr) with 100 nm of thickness was used for the contact electrode 55; aluminum (Al) with 2 μm of thickness was used for the busline electrode 32; and chromium (Cr) 200 nm thickness was used for the busline electrode upper layer 34. These electrodes were deposited by sputtering. It is preferable to use a material having high conductive property for the busline electrode 32, because wiring resistance becomes low and voltage drop at the electrode can be reduced.

Figure 16A:
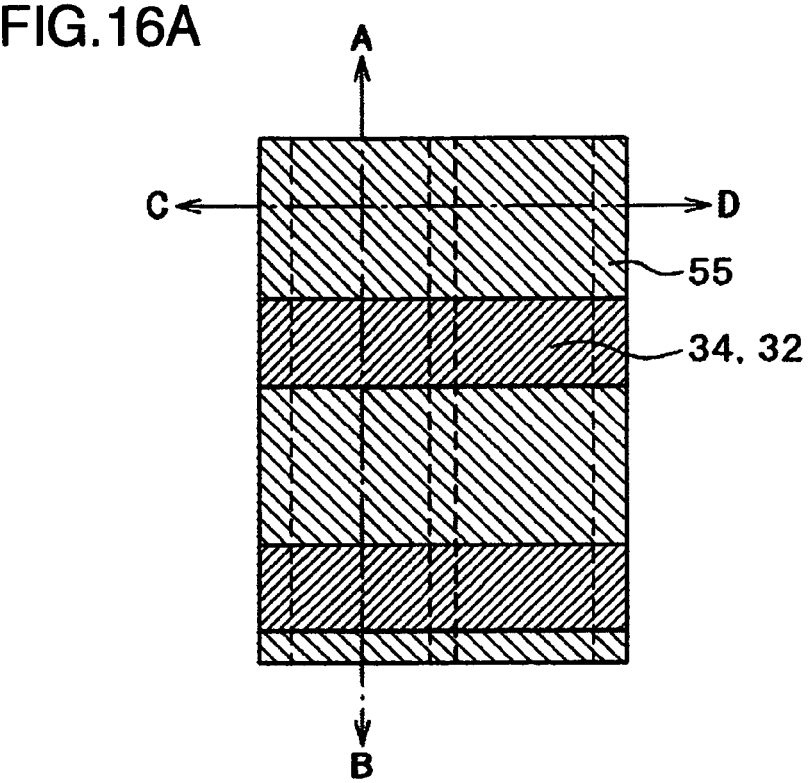
FIG. 16A is a plan view explaining a fabrication process of a cathode plate of Embodiment 1 of an image display apparatus according to the present invention.
Figure 16B:
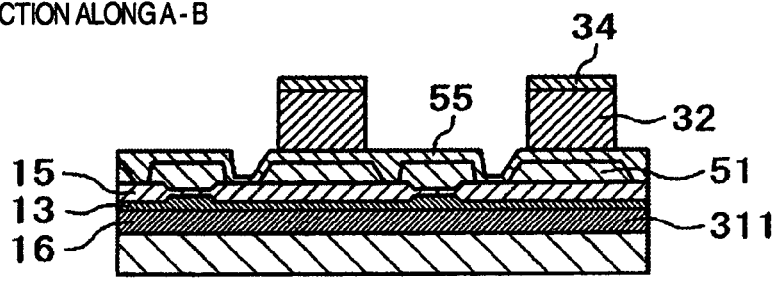
FIG. 16B is a cross-sectional view taken along the line A-B in FIG. 16A explaining a fabrication process of a cathode plate of Embodiment 1 of an image display apparatus according to the present invention.
Figure 16C:
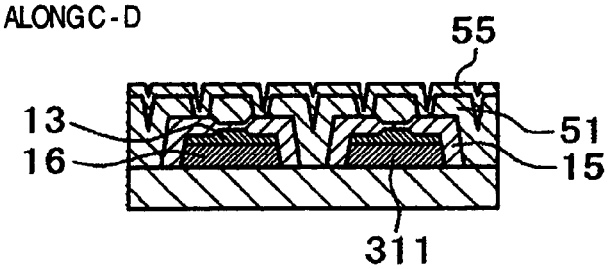
FIG. 16C is a cross-sectional view taken along the line C-D in FIG. 16A explaining a fabrication process of a cathode plate of Embodiment 1 of an image display apparatus according to the present invention.

Next, by patterning the busline electrode upper layer 34 and the busline electrode 32 by etching, and making them be exposed so as to be able to connect later the top electrode 11 with the contact electrode 55, the busline electrode 32 is formed (FIGS. 16A to 16C).

Figure 17A:
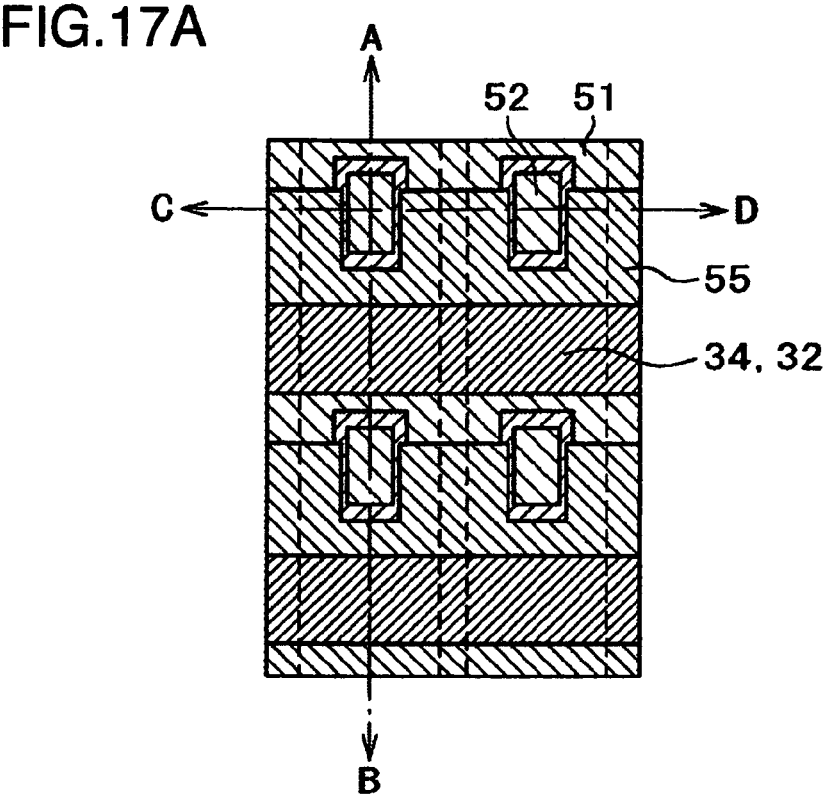
FIG. 17A is a plan view explaining a fabrication process of a cathode plate of Embodiment 1 of an image display apparatus according to the present invention.
Figure 17B:
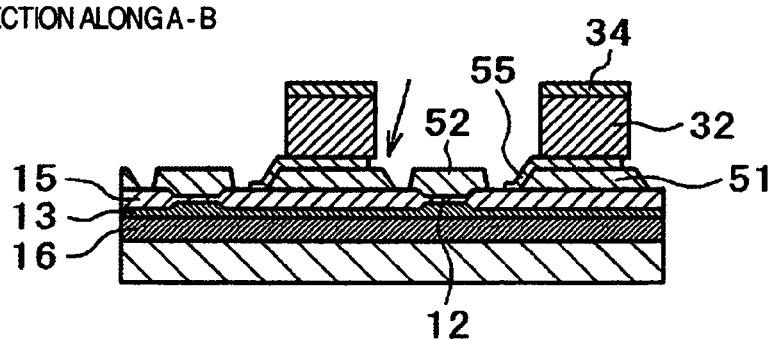
FIG. 17B is a cross-sectional view taken along the line A-B in FIG. 17A explaining a fabrication process of a cathode plate of Embodiment 1 of an image display apparatus according to the present invention.
Figure 17C:
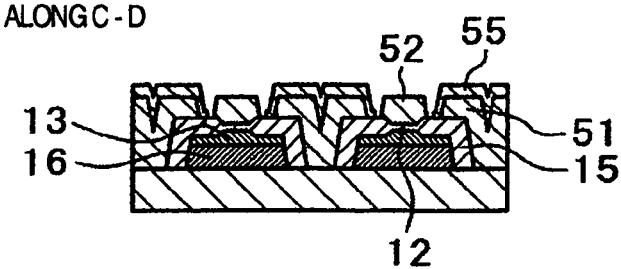
FIG. 17C is a cross-sectional view taken along the line C-D in FIG. 17A explaining a fabrication process of a cathode plate of Embodiment 1 of an image display apparatus according to the present invention.

Next, the contact electrode 55 is patterned by etching (FIGS. 17A to 17C). By patterning the contact electrode 55 in this step, the feeding condition from the contact electrode 55 to the electron emission area 35 is decided.

As shown in FIG. 17A, the contact electrode 55 is formed in a pattern, along the three sides out of four sides of the electron emission area 35. As described above, the feeding capacity is improved by making three-side feeding structure in this way.

As shown by an arrow in the cross-sectional view in FIG. 17B, one side (a part indicated by an arrow in the drawing) of the contact electrode 55, forms an undercut against the busline electrode 32, and forms an overhang in order to separate the top electrode 11 electrically at the later step. Because of the presence of this undercut, the top electrodes of sub-pixel connected with a neighboring scan line are electrically insulated (separated) mutually. This is referred to as "an electrical separation between electron emission elements".

The amount of the undercut of the contact electrode 55 is controlled as described below.

The part where an undercut is formed, is obtained by etching the contact electrode 55 with using a side of the busline electrode 32 as a photo-mask. Accordingly, the contact electrode 55 generates an undercut against the busline electrode 32. On the other hand, if an undercut is too large, the overhang is lost because the busline electrode 32 falls down and the busline electrode 32 contacts with the second inter-layer insulating film 51. Therefore, in order to prevent a formation of too large undercut, a material whose standard electrode potential is nobler than that of the material of the busline electrode 32, is used as a material of the contact electrode 55. That is, for the contact electrode 55, a material which is higher in standard electrode potential than a material of the busline electrode 32, is used.

In the case that aluminum is used for a busline electrode, such a material includes chromium (Cr), molybdenum (Mo), or a Cr alloy, for example, or an alloy containing these elements, such as a molybdenum-chromium-nickel alloy, for example. In this way, it is possible to prevent that the amount of the undercut increases too much, because the side etching of the contact electrode 55 stops midway due to a local cell mechanism. Further, by controlling the area of the busline electrode which is less noble (lower) in standard electrode potential, exposed to the etching reagent, it is possible to control a local cell mechanism and to control the side etching stop position of the contact electrode 55 (that is, the amount of the undercut). For this purpose, the busline electrode upper layer 34 which uses chromium (Cr) as a material, is formed.

As understood from the above description, it is preferable to use a material which is nobler (higher) in standard electrode potential than a material of the busline electrode 32, for a material of the contact electrode 55.

Figure 18A:
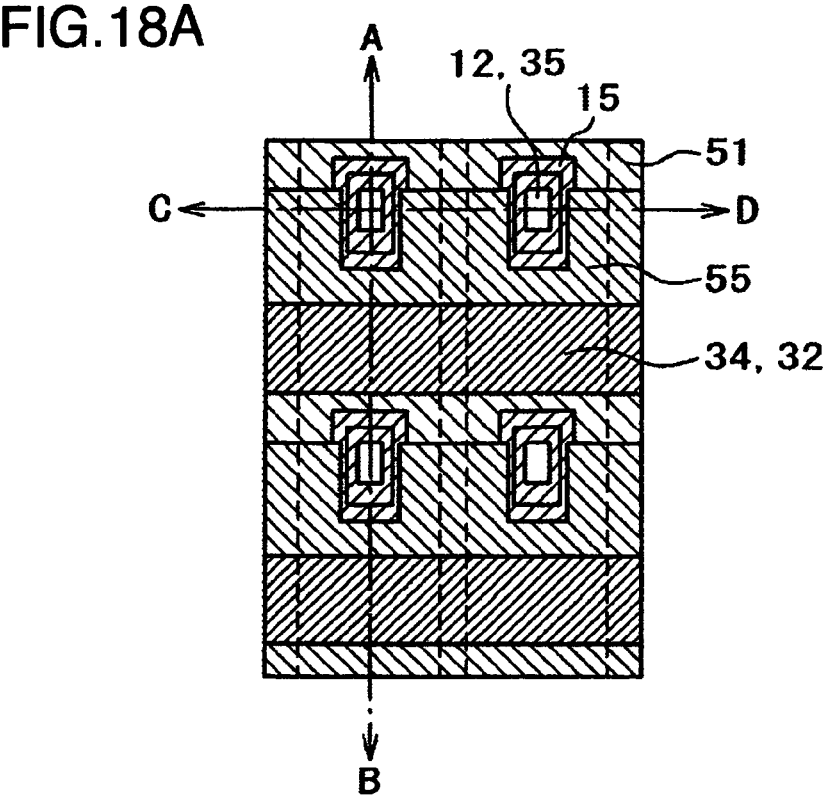
FIG. 18A is a plan view explaining a fabrication process of a cathode plate of Embodiment 1 of an image display apparatus according to the present invention.
Figure 18B:
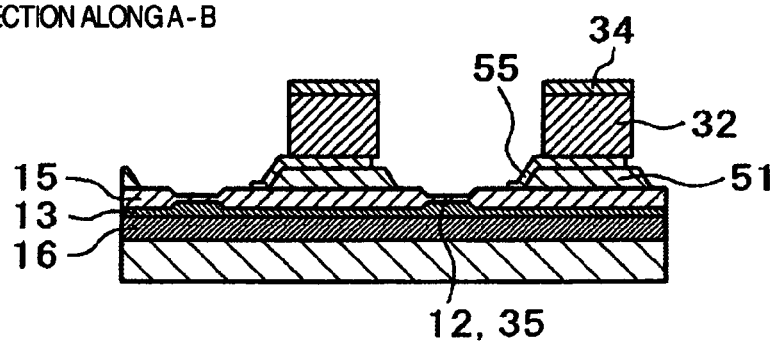
FIG. 18B is a cross-sectional view taken along the line A-B in FIG. 18A explaining a fabrication process of a cathode plate of Embodiment 1 of an image display apparatus according to the present invention.
Figure 18C:
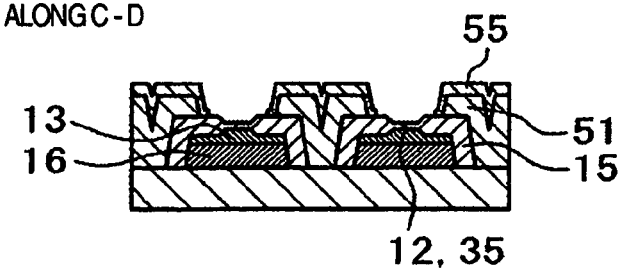
FIG. 18C is a cross-sectional view taken along the line C-D in FIG. 18A explaining a fabrication process of a cathode plate of Embodiment 1 of an image display apparatus according to the present invention.
Figure 19A:
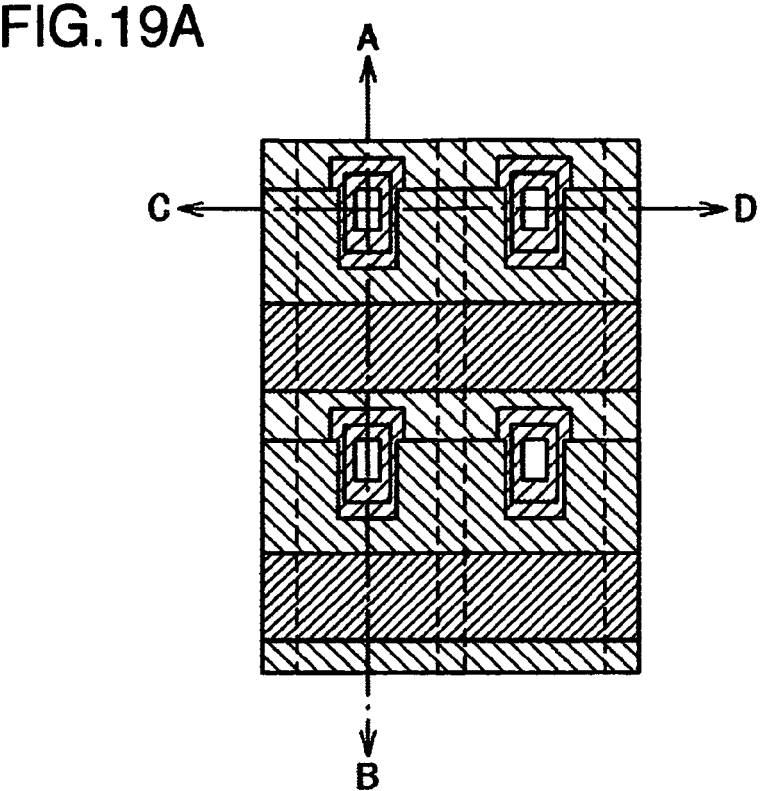
FIG. 19A is a plan view explaining a fabrication process of a cathode plate of Embodiment 1 of an image display apparatus according to the present invention.
Figure 19B:
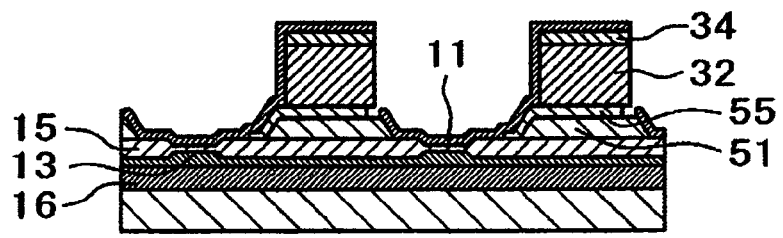
FIG. 19B is a cross-sectional view taken along the line A-B in FIG. 19A explaining a fabrication process of a cathode plate of Embodiment 1 of an image display apparatus according to the present invention.
Figure 19C:
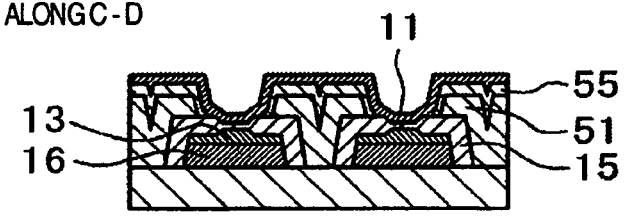
FIG. 19C is a cross-sectional view taken along the line C-D in FIG. 19A explaining a fabrication process of a cathode plate of Embodiment 1 of an image display apparatus according to the present invention.

Next, the electron emission area protection layer 52 is removed by dry etching or the like (FIGS. 18A to 18C). Next, the top electrode 11 is formed to complete the cathode plate 601 (FIGS. 19A to 19C). In the present embodiment, as the top electrode 11, the stacked film of iridium (Ir), platinum (Pt), and gold (Au) was used. The top electrode 11 was formed by sputter deposition. It should be noted that, though the top electrode 11 is deposited actually on the whole surface, to make the structure be easily understood, FIG. 19A shows a view in which the top electrode is removed. In addition, the position of the data electrode 311 is described by dotted lines.

As shown in FIGS. 19A to 19C, an electric current is supplied to the top electrode 11 in the electron emission area 35 through the contact electrode 55 from the busline electrode 32 which is a current feeding line. On the other hand, as described above, because the appropriate amount of undercut is formed on the contact electrode 55, electrical insulation is kept mutually between the neighboring scan electrodes 310.

In the present embodiment, a cathode structure in which two features are taken in, is adopted; a feature (feature "A") that 3 sides of the electron emission area are used as a feed path to the top electrode 11 in the electron emission area 35 from the busline electrode 32, and a feature (feature "B") that a step in the second inter-layer insulating film is removed from the feed path to the top electrode in the electron emission area. Because the width of the feed path becomes larger due to the feature "A", a feeding resistance decreases. The feeding resistance of the feed path decreases due to the feature "B". Because the feeding resistance decreases in this way, it is possible to make the top electrode thin, and as a result, to improve an electron emission efficiency (electron emission ratio).

In Embodiment 1, feeding is not carried out from a side opposite to the busline electrode 32 electrically connected, among four sides of the electron emission area 35. Therefore, compared with the case that the electron emission area 35 is entirely used as a feed path, the structure is easy to fabricate because an alignment margin (margin) to a mask is larger. In addition, because the difference of the feeding capacity between the feeding of the whole sides and the feeding of three sides excluding a shorter side, is small, the present structure is a structure satisfying both of easiness in fabrication and the feeding capacity.

The structure of the phosphor plate 602 is as follows. As shown in FIGS. 10A to 10C, a black matrix 120 is formed on a transparent faceplate 110 such as glass, and further the phosphor 114 is formed at the position opposite to every electron emission area. In the case of a color image display apparatus, as the phosphor 114, a red phosphor, a green phosphor, and a blue phosphor are patterned. Further, the acceleration electrode 122 is formed. The acceleration electrode 122 is formed by an aluminum film having about 70 to 100 nm thickness, and electrons emitted from the thin-film electron emitter 301, impinge the acceleration electrode 122 after accelerated by an acceleration voltage applied to the acceleration electrode 122, and impinge the phosphor 114 after going through the acceleration electrode, and the phosphor emits light. The details of a method to fabricate the phosphor plate 602 are described, for example, in JP-A-2001-83907.

The appropriate number of pieces of the spacer 60 is placed between the cathode plate 601 and the phosphor plate 602. As shown in FIG. 7, the cathode plate 601 and the phosphor plate 602 are sealed with the frame component 603 interleaved inside. Further, the space surrounded by the cathode plate 601, the phosphor plate 602 and the frame component 603 is pumped to vacuum.

The display panel is completed by the procedure described above.

Figure 20:
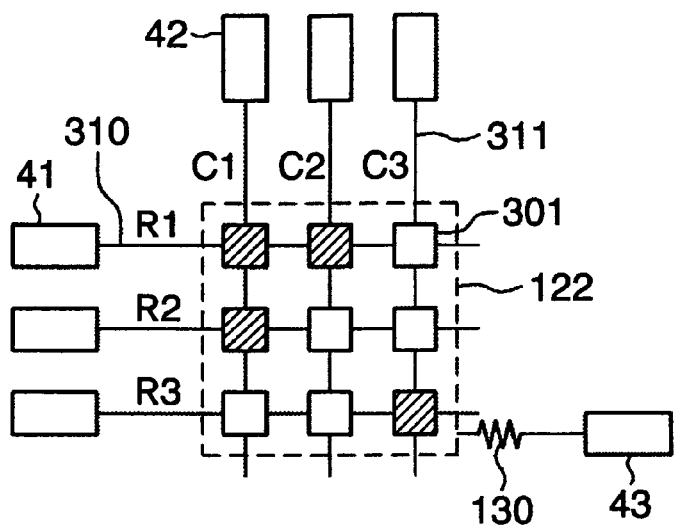
FIG. 20 is a view showing a connection of a driving circuit and a display panel of Embodiment 1 of an image display apparatus according to the present invention.

FIG. 20 is a connecting diagram showing a driving circuit of the display panel 100 fabricated in this way. The scan electrode 310 is wire-connected with a scan-electrode drive circuit 41 and the data electrode 311 is wire-connected with a data-electrode drive circuit 42. The acceleration electrode 122 is wire-connected with an acceleration-electrode drive circuit 43 through a resistor 130. A dot at an intersection between "n" th scan electrode 310 Rn and "m" th data electrode 311 Cm is expressed as (n, m).

The resistance value of the resistor 130 was set as below. For example, a display apparatus with a diagonal size 51 cm (20 inch) has a display area 1240 cm$^2$. In the case that the distance between the acceleration electrode 122 and the cathode is set to 2 mm, a capacitance Cg between the acceleration electrode 122 and the cathode is about 550 pF. In order to make a time constant sufficiently longer, for example 500 nanoseconds, than a time duration of a vacuum discharge (about 20 nanoseconds), it is sufficient to set the resistance value Rs of the resistor 130, equal to or larger than 900Ω. In the present embodiment, it was set to 18 KΩ (a time constant 10 μs). In this way, inserting a resistor with the resistance value satisfying a time constant Rs×Cg>20 ns between the acceleration electrode 122 and the acceleration-electrode drive circuit 43, is effective to prevent the generation of vacuum discharge in a display panel.

Figure 21:
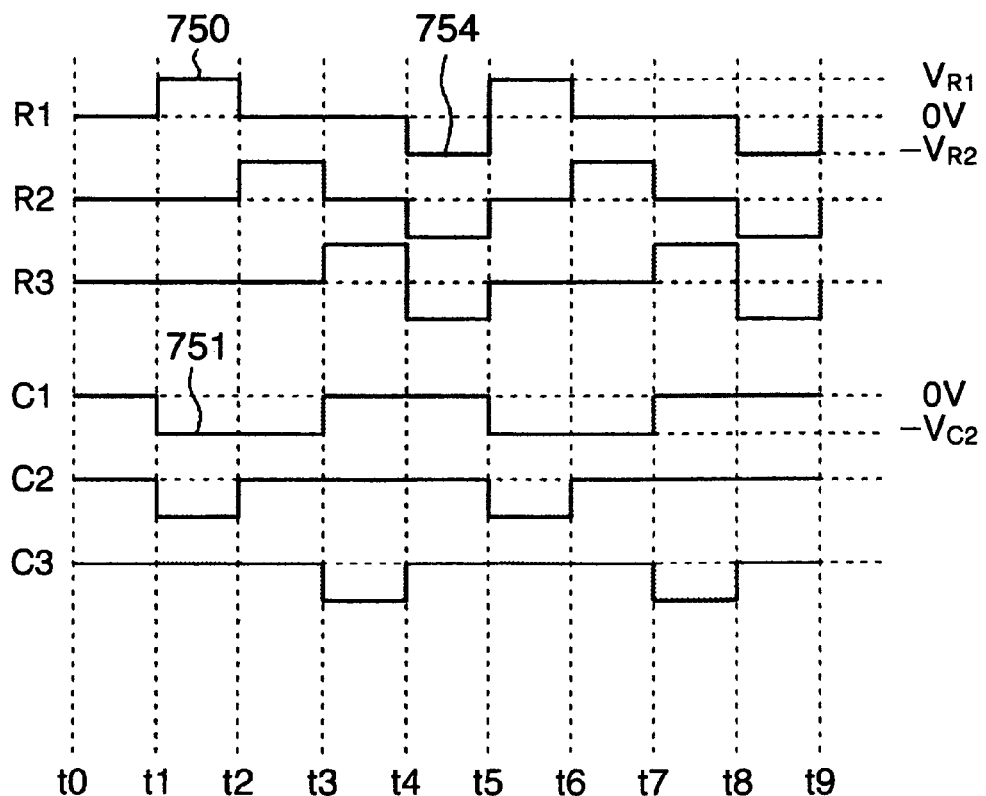
FIG. 21 is a view showing drive waveforms of Embodiment 1 of an image display apparatus according to the present invention.

FIG. 21 shows waveforms of generated voltage in every driving circuit. Though not shown in FIG. 21, voltage (phosphor screen voltage Va) of about 3 to 10 KV is applied to the acceleration electrode 122. At a time t0, because voltage of every electrode is 0, an electron is not emitted and consequently the phosphor 114 does not emit light.

At a time t1, a scan pulse 750 with voltage VR1 is applied to a scan electrode 310R1, and a data pulse 751 with voltage −VC1 is applied to the data electrodes 311C1 and C2. Voltage (VC1+VR1) is applied between the base electrode 13 and the top electrode for dots (1, 1) and (1, 2), therefore, if (VC1+VR1) is set higher than or equal to a threshold voltage for electron emission, electrons are emitted to vacuum 10 from the thin-film electron emitters of these 2 dots. In the present embodiment, VR1=+5 V and −VC1=−4 V were set. After electrons emitted are accelerated by voltage applied to the acceleration electrode 122, they impinge the phosphor 114 and the phosphor 114 emits light.

At a time t2, if voltage VR1 is applied to the scan electrode 310R2, and voltage −VC1 is applied to the data electrode 311C1, dot (2, 1) lights up in the same way. If voltage waveform in FIG. 21 is applied in this way, only dots shaded in FIG. 20 light up.

In this way, it is possible to display image or information desired by changing a signal applied to the data electrode 311. In addition, by changing accordingly the magnitude of applied voltage −VC1 to the data electrode 311 in response to the image signal, it is possible to display an image with gray scale.

As shown in FIG. 21, voltage −VR2 is applied to every scan electrode 310 at a time t4. In the present embodiment, −VR2=−5 V was set. Then, because applied voltage to every data electrode 311 is 0 V, voltage −VR2=−5 V is applied to the thin-film electron emitter 301. In this way, a voltage whose polarity is reverse to the voltage applied during electron emission is applied; the reverse polarity pulse is called reverse pulse 754. By applying a reverse polarity voltage, electrical charges accumulated in traps in the insulating layer 12 are liberated, and it is possible to improve a lifetime characteristic of a thin-film electron emitter. In addition, application of reverse pulse 754 within the vertical blanking period of a video signal leads to a good match with the video signal.

In an explanation of FIGS. 20 and 21, though the explanation was made by using an example of 3×3 dot for simplicity, in an actual image display apparatus, the number of scan electrodes is several hundreds to several thousands lines, and the number of the data electrodes is also several hundreds to several thousands lines. In the present embodiment, a base electrode is constructed by the base electrode first layer 16 and the base electrode second layer 13. This point will be described below.

In the present embodiment, because the insulating layer 12 is formed by anodizing a base electrode, a part of a base electrode material is converted into the insulating layer 12 and the remaining part makes up the base electrode. Therefore, it is necessary for the base electrode material to have both (a) a characteristic suitable to an electrode and (b) a characteristic of its anodized film suitable as the insulating layer 12. However, there is a case where it is difficult to satisfy both of the characteristics, (a) and (b). Or, there is also a problem that it makes the option for the material selection small to try to satisfy both of the two characteristics, (a) and (b).

As a concrete example, as described later, because the lower the Nd concentration in the insulating layer 12 is, the better a residual image characteristic is, it is desirable to lower the Nd concentration in a base electrode material from a standpoint (b) of an anodized film characteristic. On the other hand, if the Nd concentration in an Al electrode is made small, hillocks are generated in a sealing step (about 430° C.) for a display panel; and these hillocks cause insulation failure or degradation of an electron emission element. Therefore, it is desired that the Nd concentration is equal to or higher than 1% as the characteristic (a) of an electrode for a base electrode.

In addition, in the present embodiment, in order to simplify a structure of a display panel, the same material is used both for the data electrode 311 and a base electrode. It is desirable to use a low resistant material for the data electrode 311 which also function as a wiring component. There is a case where this requirement is not compatible with a characteristic of an anodized film.

In the present embodiment, in order to satisfy these two required characteristics, (a) and (b), a stacked structure having two or more layers is used for a base electrode. That is, in order to make a base electrode first layer have a desirable characteristic as an electrode, an Al—Nd alloy having equal to or larger than 1.0% Nd concentration which is effective for the prevention of a hillock formation at high temperature, is used. On the other hand, an Al—Nd alloy having 0.6% Nd concentration is used for a base electrode second layer, and the insulating layer 12 is formed by anodizing the base electrode second layer 13. By this, a characteristic (that is, Nd concentration is low) desired for the insulating layer 12 is obtained.

In this case, though the base electrode second layer 13 is a low concentration film having Nd concentration equal to or lower than 1%, the generation of a hillock is prevented because designed as described below. First, the generation of a hillock at high temperature is prevented in the case that a film thickness of an Al film is small. Accordingly, by setting a film thickness of the base electrode second layer 13 equal to or smaller than 500 nm, the generation of a hillock is suppressed. Second, because a diffusion phenomenon of an Nd atom occurs at a high temperature process, Nd concentration in the base electrode second layer 13 becomes high and the generation of a hillock is prevented more effectively. This point will be explained below using FIGS. 22A to 22D.

Figure 22A:
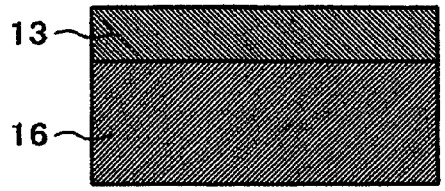
FIG. 22A is a view showing a relationship between a stacked structure of a base electrode and an insulating layer.
Figure 22C:
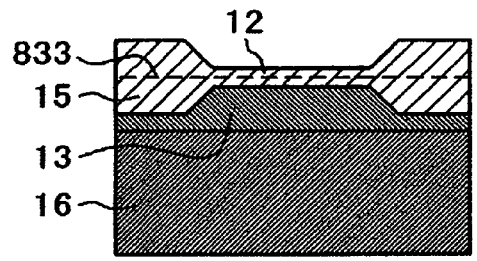
FIG. 22C is a view showing a relationship between a stacked structure of a base electrode and an insulating layer.
Figure 22B:
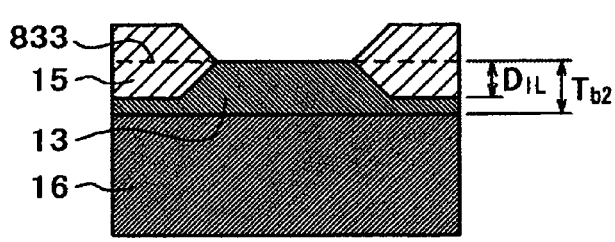
FIG. 22B is a view showing a relationship between a stacked structure of a base electrode and an insulating layer.
Figure 22D:
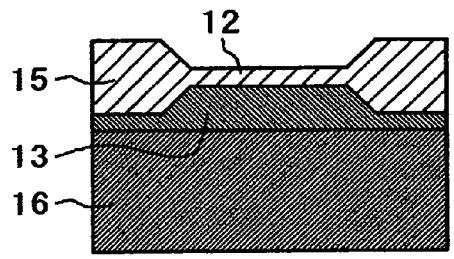
FIG. 22D is a view showing a relationship between a stacked structure of a base electrode and an insulating layer.

FIGS. 22A to 22D are describing exemplarily a base electrode part and an anodized film part taken out from a fabricating process in the present embodiment. In FIG. 22A, the base electrode first layer 16 and the base electrode second layer 13 are stacked. FIG. 22B is a view after the first interlayer insulating film 15 is formed. FIG. 22C is a view after the insulating layer 12 is formed by an anodization method. As described in the present embodiment, the base electrode first layer 16 is set to Al—Nd (2 at %) and the base electrode second layer 13 is set to Al—Nd (0.6 at %). (It is obvious that the present invention is not limited to these figures of Nd concentration.) Then, at a time of FIG. 22C, Nd concentration in the base electrode second layer 13 is 0.6 at %. FIG. 22D is a view after this thin-film electron emitter is passed through a sealing step (maximum temperature 430° C.). We found that Nd atom diffusion occurs by a thermal process in the sealing step for a display panel, and after sealing the Nd concentration in the base electrode second layer 13 increases up to around 2%. This is the second reason why a hillock is prevented by the constitution of the present invention.

Figure 23:
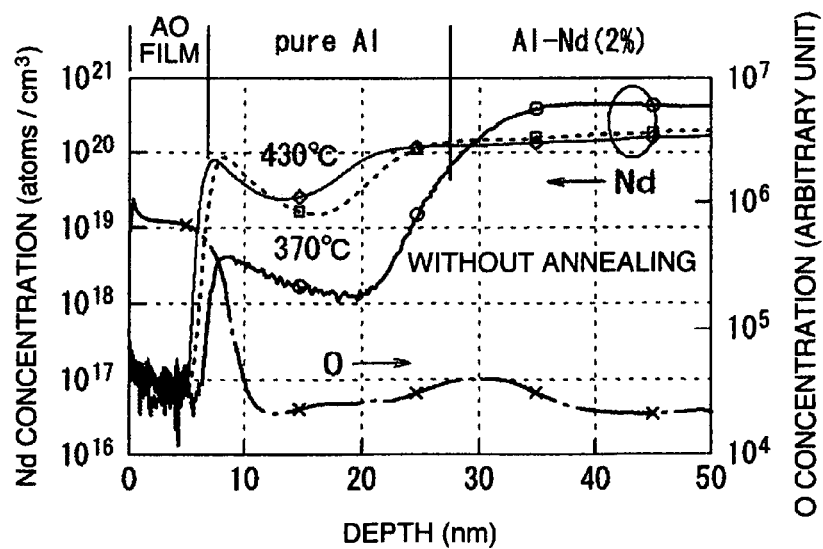
FIG. 23 is a diagram showing a distribution of an additive element in an insulating layer and a base electrode.

FIG. 23 shows a result of a depth analysis of Nd concentration for a sample annealed after a stacked film which is stacked with pure aluminum films (film thickness 28 nm) on an Al—Nd (2 at %) film, is anodized. The depth analysis was carried out by secondary ion mass spectrometry (SIMS). In the case of a sample which is not annealed, the Nd concentration in the pure aluminum film layer is about 1/100 of that in the Al—Nd (2 at %) film layer. However, in both of a sample annealed at 370° C. and a sample annealed at 430° C., it is found that Nd diffuses into the pure aluminum film layer. In addition, it is found that a Nd atom is not detected in the anodized film layer even in the case of a sample annealed.

Thus, because an Nd element does not diffuse into the insulating layer 12 which is an anodized film, Nd concentration in the insulating layer 12 remains low after a panel sealing. That is, the characteristic needed for the insulating layer 12 is satisfied. Accordingly, in the case that a display panel is fabricated according to a fabrication method described in the present embodiment, in a display panel after sealing, Nd concentration in the base electrode second layer 13 is higher than 0.6 at % and Nd concentration in the insulating layer 12 remains about 0.6 at %.

A method to identify a position of an interface between the base electrode first layer 16 and the base electrode second layer 13 will be described below. It should be noted that in the present specification, an interface between the base electrode first layer 16 and the base electrode second layer 13 is referred to as a stack interface. After a panel sealing step (that is, a high temperature treatment step) is processed, because diffusion of an additive element (Nd atom in an Al—Nd alloy) occurs as described above, in some cases it is not possible to identify a stack interface only by an examination of a concentration distribution of an additive element.

Figure 27A:
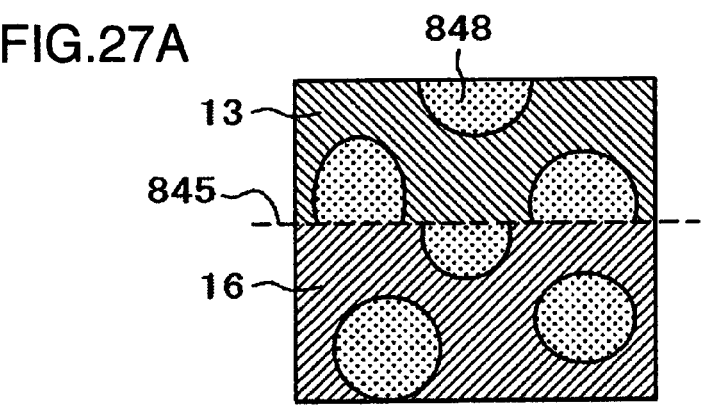
FIG. 27A is a view showing exemplarily a structure of a base electrode stacked.
Figure 27B:
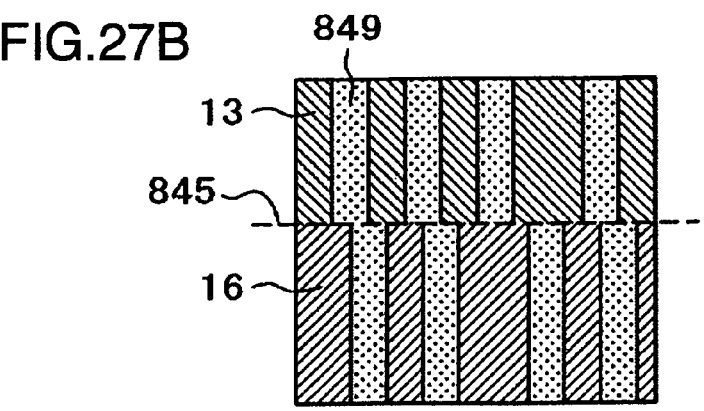
FIG. 27B is a view showing exemplarily a structure of a base electrode stacked.

FIGS. 27A and 27B are views showing exemplarily a cross-sectional TEM image (cross-sectional transmission electron microscope image) of a base electrode of a display panel (that is, after a sealing step) fabricated by the present embodiment. As shown in FIG. 27A, in each layer of the base electrode first layer 16 and the base electrode second layer 13 crystal grains 848 are observed. Because these crystal grains 848 grow in each layer, the position of the crystal grain becomes discontinuous along the stack interface 845. That is, it is possible to determine that a boundary where the crystal grains 848 become discontinuous is a position of the stack interface 845. In addition, there are some cases where the columnar striped pattern 849 are observed as in FIG. 27B depending on a depositing method of a base electrode, a material or a sealing temperature; in this case it is possible to determine that a discontinuous boundary of the columnar striped pattern 849 is a position of the stack interface 845.

It should also be noted for a concentration of an additive element (for example, Nd in the case of an Al—Nd alloy) in the base electrode second layer 13. That is, because the additive element diffuses at a display panel sealing step, the concentration of the additive element in a base electrode second layer after passed through at a panel-sealing step, does not coincide with the original concentration. As understood from FIG. 23, because the additive element does not diffuse into an anodized film, a concentration of the additive element in the anodized film formed in the base electrode second layer 13, is the same as the original additive element concentration.

More strictly, because the number of atoms changes by oxidization of a base electrode second layer, it may be considered as follows. It is sufficient to consider the ratio of an additive element to a main constituent element of an alloy in the base electrode second layer 13. In this case, the main constituent element of an alloy means, for example, Al for an Al—Nd alloy and Ta for a Ta—Nd alloy. By way of example, if the case is considered where an Al—Nd alloy is anodized, it is sufficient to consider the ratio of an additive element Nd in an anodized film (the insulating layer 12) to a main constituent element Al, as an additive element concentration.

Figure 10B:
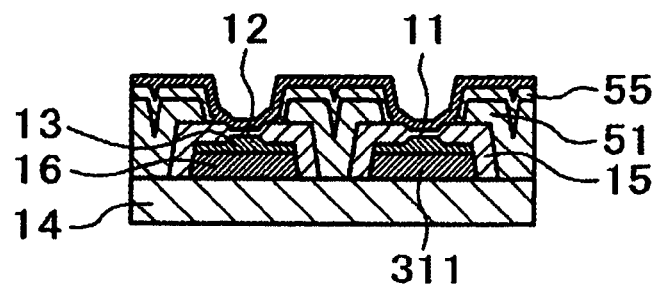

Next, the relationship between the thickness of the anodized film and the position of the stack boundary of the base electrode first layer 16 and the base electrode second layer 13, which is the second design point in the present embodiment, will be described. In the present embodiment, the first inter-layer insulating layer 15 is formed by anodizing the material of the base electrode. As described in FIG. 22B, depth DIL is defined as the depth of the anodized film of the first inter-layer insulating film 15, which depth is measured from the original aluminum metal surface position indicated by dotted line in FIG. 22B. As described in FIGS. 22B and 22C and in FIG. 10, the design is made so that the depth DIL is smaller than the film thickness Tb2 of the base electrode second layer 13. In other words, the design is made so that the anodized film never crosses the stack interface between the base electrode first layer 16 and the base electrode second layer 13. By designing the anodized film in this way, the device failure does not occur even passing through a high temperature process like a panel-sealing step and the like. This point will be described below in more detail.

Figure 24A:
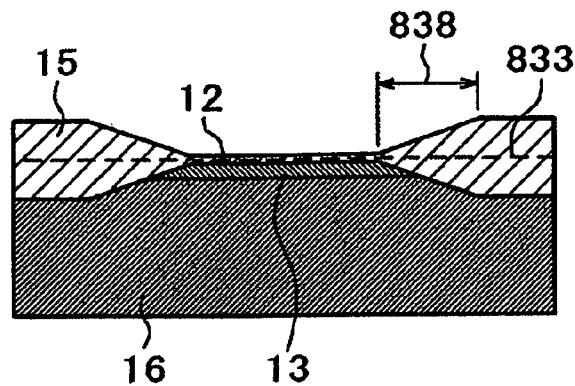
FIG. 24A is a view showing a defect phenomenon generated in a base electrode stacked.
Figure 24B:
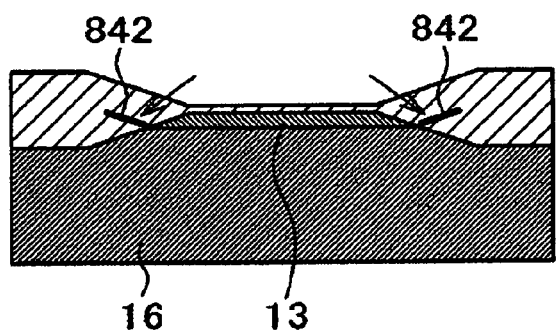
FIG. 24B is a view showing a defect phenomenon generated in a base electrode stacked.

By using a pure aluminum film with 40 nm thickness for the base electrode second layer 13, and using an Al—Nd (2 at %) film for the base electrode first layer 16, a display panel was fabricated by way of trial. The first inter-layer insulating film 15 was fabricated to have 210 nm film thickness. That is, it follows that the film thickness Tb2=40 nm of the base electrode second layer 13, and an penetration depth DIL=126 nm of the first inter-layer insulating film 15. Accordingly, because of Tb2<DIL, as shown in FIG. 24A, the structure is formed, in which an anodized film crosses the stack interface between the base electrode first layer 16 and the base electrode second layer 13. The inventors found that if a cathode with this structure is passed through a high temperature process of a sealing step, a lot of short-circuit defects in the thin-film electron emitter occur. In addition, even in a cathode which uses an Al—Nd (2 at %) film with 40 nm thickness as a base electrode second layer, a lot of short-circuit defects occur. That is, even in the case that Nd concentration is sufficiently high to prevent hillocks, a short circuit defect occurs. The inventors found that this short-circuit defect is caused by the formation of a void (a void part) 842 in a position indicated by an arrow in FIG. 24B, that is, in the transition region 838 (Bird's beak part) between the insulating layer 12 and the first inter-layer insulating film 15.

Figure 25:
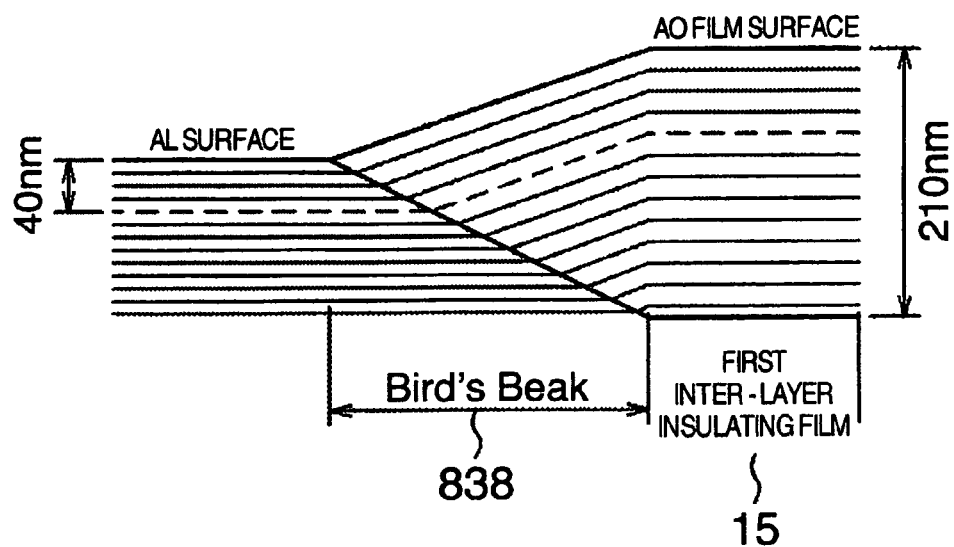
FIG. 25 is a view showing exemplarily a movement of an aluminum atom in an anodizing process.

In order to examine a mechanism of the void formation, the inventors examined the situation of position change of an atomic plane of metal atoms in an anodization process, by running a simulation. The result is shown in FIG. 25. FIG. 25 is a simulation result of a process to form the first inter-layer insulating film 15 on an aluminum surface by an anodization method. The case where an anodization voltage is set to 150 V and an anodized film thickness is 210 nm, is simulated. In an anodization, volume increases by the amount of oxygen entering a metal aluminum. Therefore, a position of an aluminum atom changes accordingly. The situation of the change is shown. (It should be noted that each of lines in FIG. 25 does not correspond to every one of atomic layers of aluminum atom.) In addition, the scale in the vertical direction (that is, in the direction of the film thickness) is different from that in the lateral direction in FIG. 25. In the drawing, while the dimension in the vertical direction is approximately 210 nm, the dimension of the transition region 838 (bird's beak region) in the lateral direction is several μm to more than dozen μm.

As understood from FIG. 25, a moving distance of an aluminum atom varies depending on the lateral position in the bird's beak region. Therefore, a stress in the lateral direction is generated. Accordingly, if a stack interface (shown by an arrow in FIG. 25) between the base electrode first layer 16 and the base electrode second layer 13 is located in the bird's beak region, a void (a void part) is generated at the stack interface due to a stress in the lateral direction. This is the cause of the short-circuit defect Based on this consideration, the inventors found that if a design is made so that an anodized film does not cross a stack interface between the base electrode first layer 16 and the base electrode second layer 13, void is not generated and accordingly a short-circuit defect is prevented.

Figure 26:
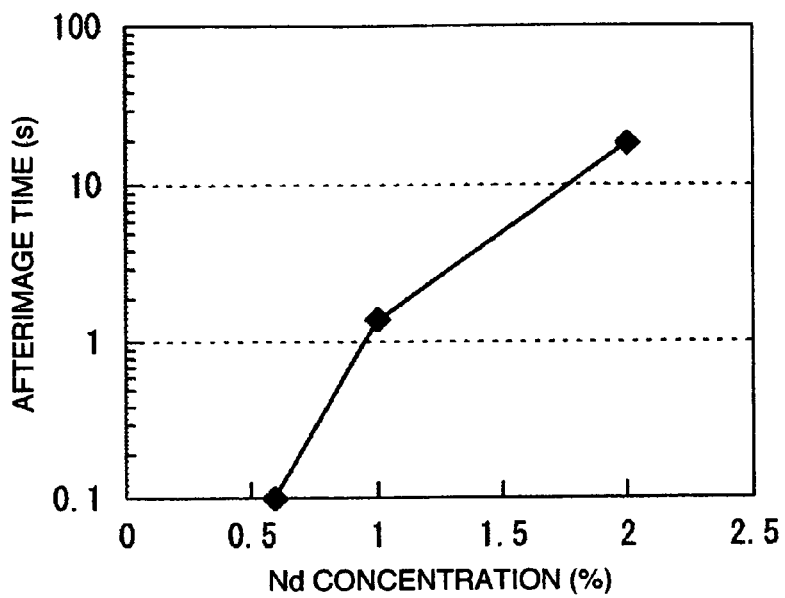
FIG. 26 is a diagram showing an afterimage characteristic of an image display apparatus of Embodiment 1.

FIG. 26 shows the result of a measurement of afterimage time of an image display apparatus fabricated as above. A afterimage time was measured when Nd concentration in the base electrode second layer 13 was changed to 0.6 at %, 1 at % and 2 at %. The measurement of a residual image time was carried out as follows. Voltage corresponding to a signal of "gray scale 255" which corresponds to the peak brightness, is applied to an image display apparatus continuously for an hour. Then, voltage is changed so as to correspond to a signal of "gray scale 100" which corresponds to the average brightness. Describing by using FIG. 4, a period of time from a time t1 to t2 was set to an hour, and the setting was made so that GS1=255 and GS2=100. Then, a recovery period of time for reaching up to 98% of the brightness L2 which corresponds to the standard gray scale, after a gray scale was changed to GS2=100 at a time t2, was defined as a afterimage time. That is, it is a period of time till (L2−ΔL2)≧0.98×L2 is obtained. It should be noted that because a brightness value is proportional to the amount of an emitted current from an electron emission element, the emitted current was measured instead of the brightness value. In addition, a diode current density for a period in response to GS1=255 is 2 A/cm$^2$ and a diode current density for a period in response to GS2=100 is 0.5 A/cm$^2$.

As understood from FIG. 26, in a conventional display apparatus (Nd concentration 2 at %) the afterimage time was 20 sec, which was clearly detected by human eyes. On the other hand, when Nd was changed to 1 at %, the afterimage time was reduced to 1.2 sec, which was smaller than or equal to 1/10 of the conventional one, and the degree of afterimage was satisfactory for human eyes. Further, when the Nd concentration was changed to 0.6 at %, the afterimage time became 0.1 sec, which was further smaller than or equal to 1/10, and the afterimage was not perceived. In this way, by reduction of the Nd concentration in the insulating layer 12, image degradation due to a afterimage phenomenon, could be eliminated.

The reason why a residual image phenomenon becomes distinct when Nd concentration in the insulating layer 12 is high, is that neodymium oxide $NdO_x$ in a insulator works as an electron trap. This is because a relative permittivity ($\epsilon r=20$) of $NdO_x$ is large comparing with a relative permittivity ($\epsilon r=9.3$) of Al oxide $AlO_x$ which is a main component of the insulating layer 12. Because an electron can be present stably in a high permittivity material, neodymium oxide works as an electron trap.

Embodiment 2

The present embodiment is the case where pure aluminum is used as the base electrode second layer 13, in Embodiment 1. If pure aluminum is used as a single film, hillocks are generated at a sealing step for a panel, and this results in occurrence of a short circuit defect. However, it is sufficient that an alloy which is hillock-resistant like Al—Nd (2 at %), is used as the base electrode first layer 16 as in the present embodiment, and used after stacking a film of film thickness smaller than or equal to 500 nm on it. As shown in FIG. 23, Nd diffuses from the base electrode first layer at a high temperature process, hillocks can be prevented.

In the present embodiment, a highly good afterimage characteristic was obtained because the Nd concentration in the insulating layer 12 was extremely low.

Embodiment 3

In the present embodiment, an Al—Mg alloy is used as a material of the base electrode second layer 13. A material of the base electrode first layer 16 is an Al—Nd alloy. It is preferable to use an Al—Mg alloy because of the following reasons. (a) Because magnesium is able to be anodized and an oxide of magnesium has a high insulation property. Accordingly, the insulating layer 12 formed by anodizing the base electrode second layer 13, is excellent in an insulation property. (b) Because Nd is not included as an additive, Nd concentration in the insulating layer 12 becomes sufficiently low and an afterimage property is excellent. (c) Because a relative permittivity Er of an oxide (MgO) of magnesium is 9.65 and is similar to that of an oxidized film of aluminum, an electron trap is not formed.

The afterimage time of an image display panel fabricated in this way, was 0.15 sec. A measurement condition was the same as that in Embodiment 1. Describing by using FIG. 4, a period of time from a time t1 to t2 was set to an hour, and the setting was made so that GS1=255 and GS2=100. Then, a recovery period of time for reaching up to 98% of the brightness L2 which corresponds to the standard gray scale, after a gray scale was changed to GS2=100 at a time t2, was defined as a residual image time.

As shown in FIG. 26, an afterimage time is 1.5 sec in the case that Nd concentration is 1 at %. On the other hand, in the case that Mg concentration is 1 at %, an afterimage time is 0.15 sec which is 1/10 of the afterimage time in the case of 1 at % Nd. This shows that the presence of Mg element in an anodized film does not work as a trap as in the case of Nd. The reason is described in the above.

In the present embodiment, though an example in which an Al—Mg alloy was used as the base electrode second layer 13, there are preferable alloys other than this as described below, and it is obvious that the effect of the present invention can be obtained by using them.

An Al—Y alloy and an Al—Zr alloy are alloys which have characteristics of (a) to (c) described above. A relative permittivity $\epsilon r$ of an additive element is, $\epsilon r=14$ for $Y_2O_3$ and $\epsilon r=12.5$ for ZrO, and each of them has a value similar to a relative permittivity of $Al_2O_3$. In addition, because Sc is an element which is similar to Al in chemical properties, in an anodized film of an Al—Sc alloy, it is difficult for an additive element to become a trap.

An Al—Ta alloy and an Al—Ti alloy have a characteristic (a) and a characteristic preferable as an anodized film. However, it has a disadvantage that it has a high wiring resistance than an Al—Nd alloy. Therefore, especially in the case that a base electrode doubles as a data electrode, a combination is preferable, wherein an Al—Nd alloy which has low wiring resistance, is used for a base electrode first layer, and an Al—Ta alloy and an Al—Ti alloy are used for a base electrode second layer.

Embodiment 4

Figure 28A:
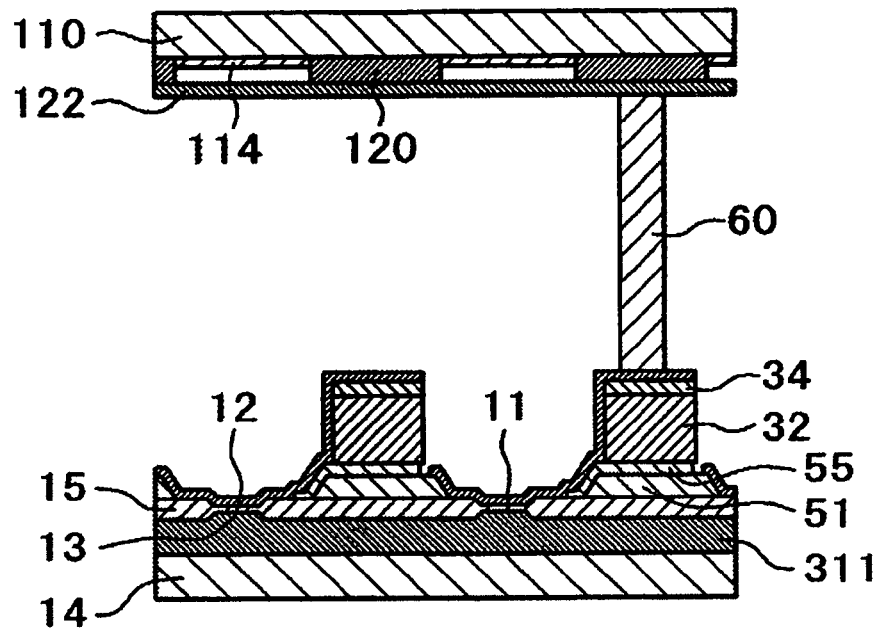
FIG. 28A is a cross-sectional view, taken along the line A-B in FIG. 9, showing a part of a cathode plate of Embodiment 4 of an image display apparatus according to the present invention.
Figure 28B:
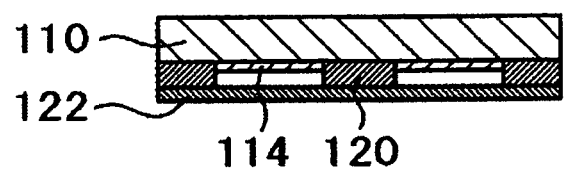
FIG. 28B is a cross-sectional view, taken along the line C-D in FIG. 9, showing a part of a cathode plate of Embodiment 4 of an image display apparatus according to the present invention.
Figure 28B:
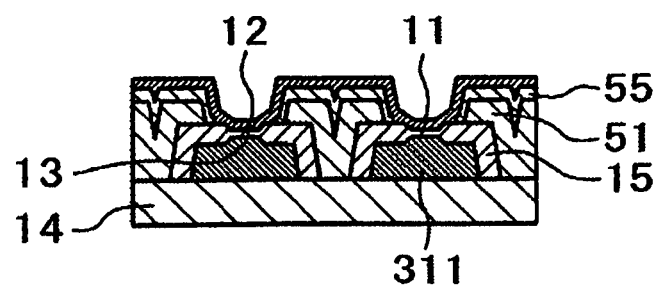

Cross sectional views showing a cathode plate of a display panel used in the present embodiment are the same as FIGS. 10A and 10B. A cross-sectional view taken along the line A-B in the plan view (FIG. 9) is shown in FIG. 28A and a view taken along the line C-D is shown in FIG. 28B.

The difference between the present embodiment and Embodiment 1 is that, in the present embodiment, the base electrode 13 is formed by a single film. In the present embodiment, Al—Mg (2 at %) is used as the base electrode 13. Other fabrication methods are the same as those for Embodiment 1.

Because an Al—Mg alloy is more hillock resistant than a pure aluminum film, it can be used as a single film. In addition, because Mg does not work as a trap even when it is present in an anodized film, the degree of degradation of an afterimage characteristic is small as compared with the case that an Nd atom is present. Therefore, even when Al—Mg (2 at %) is used, a satisfactory afterimage characteristic can be obtained.

The present embodiment is easy to fabricate as compared with Embodiment 1 in that only one time is necessary for the number of times of depositing for the base electrode 13.

In the present embodiment, though an example in which an Al—Mg alloy is used, was described, the similar effect can be obtained even when an Al—Y alloy or an Al—Sc alloy is used.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An image display apparatus provided with a substrate having a plurality of electron emission elements, and a faceplate having a phosphor, wherein said electron emission element has a base electrode, a top electrode and a first insulating layer interleaved between said base electrode and said top electrode, and is a thin-film electron emitter which emits electrons from said top electrode side by applying voltage between said base electrode and said top electrode, characterized in that:

said first insulating layer defining an electron emission area, a second insulating layer thicker than said first insulating layer and composed of an oxidized film formed by oxidizing said base electrode, and a transition region where film thickness changes continuously between said first insulating layer and said second insulating layer, are formed on said base electrode;

said base electrode comprises a stacked structure of a base electrode first layer and a base electrode second layer;

said base electrode first layer comprises an aluminum alloy having an additive element; said base electrode second layer is an aluminum alloy a content ratio of said additive element to a main constituent element is smaller in said first insulating layer than that in said base electrode first layer;

and a stack interface between said base electrode first layer and said base electrode second layer is not included in said second insulating layer.

2. The image display apparatus according to claim 1 wherein
said first insulating layer and said second insulating layer are anodized films formed by anodizing said base electrode second layer.

3. The image display apparatus according to claim 1, characterized in that said base electrode second layer is an alloy having a main constituent element and an additive element and said main constituent element is an element which can be anodized.

4. The image display apparatus according to claim 1, characterized in that said base electrode first layer is an aluminum-neodymium alloy and a neodymium concentration is larger than or equal to 1 atomic %.

5. The image display apparatus according to claim 1, characterized in that neodymium concentration included in said first insulating layer is less than 2 atomic % of a main constituent of the original alloy.

6. The image display apparatus according to claim 1, characterized in that said base electrode first layer and said base electrode second layer are aluminum alloys, and neodymium concentration to a main constituent of the original alloy included in said first insulating layer is less than or equal to one half of neodymium concentration in said base electrode first layer.

7. The image display apparatus according to claim 1, characterized in that said first insulating layer does not contain neodymium.

8. The image display apparatus according to claim 1, characterized in that said first insulating layer is a film formed by anodizing aluminum.

9. The image display apparatus according to claim 1, characterized in that said base electrode second layer is an alloy having aluminum and an additive element, and said additive element is anyone of scandium (Sc), yttrium (Y), magnesium (Mg) and zirconium (Zr) or a plurality of their combination.

10. An electron emission element, comprising:
a base electrode, a top electrode and a first insulating layer interleaved between said base electrode and said top electrode, and a thin-film electron emitter which emits electrons from said top electrode side by applying voltage between said base electrode and said top electrode, characterized in that:

said first insulating layer defining an electron emission area, a second insulating layer thicker than said first insulating layer and composed of an oxidized film formed by oxidizing said base electrode, and a transition region where film thickness changes continuously between said first insulating layer and said second insulating layer, are formed on said base electrode;

said base electrode comprises a stacked structure of a base electrode first layer and a base electrode second layer;

said base electrode first layer comprises an aluminum alloy having an additive element; said base electrode second layer is an aluminum alloy a content ratio of said additive element to a main constituent element is smaller in said first insulating layer than that in said base electrode first layer; and a stack interface between said base electrode first layer and said base electrode second layer is not included in said second insulating layer.

11. The electron emission element according to claim 10, characterized in that said first insulating layer and said second insulating layer are anodized films formed by anodizing said base electrode second layer.

12. The electron emission element according to claim 10, characterized in that said base electrode second layer is an alloy having a main constituent element and an additive element and said main constituent element is an element which can be anodized.

13. The electron emission element according to claim 10, characterized in that said base electrode first layer is an aluminum-neodymium alloy and a neodymium concentration is larger than or equal to 1 atomic %.

14. The electron emission element according to claim 10, characterized in that neodymium concentration included in said first insulating layer is less than 2 atomic % of a main constituent of the original alloy.

15. The electron emission element according to claim 10, characterized in that said base electrode first layer and said base electrode second layer are aluminum alloys, and neodymium concentration to a main constituent of the original alloy included in said first insulating layer is less than or equal to one-half of neodymium concentration in said base electrode first layer.

16. The electron emission element according to claim 10, characterized in that said first insulating layer does not contain neodymium.

17. The election emission element according to claim 10, characterized in that said first insulating layer is a film formed by anodizing aluminum.

18. The electron emission element according to claim 10, characterized in that said base electrode second layer is an alloy having aluminum and an additive element, and said additive element is any one of scandium (Sc), yttrium (Y), magnesium (Mg) and zirconium (Zr) or a plurality of their combination.

* * * * *